United States Patent
Nedbal et al.

(10) Patent No.: US 11,368,488 B2
(45) Date of Patent: Jun. 21, 2022

(54) OPTIMIZING A SECURITY CONFIGURATION OF A NETWORKED ENVIRONMENT

(71) Applicant: Fortinet, Inc., Sunnyvale, CA (US)

(72) Inventors: Manuel Nedbal, Santa Clara, CA (US); Ratinder Paul Singh Ahuja, Saratoga, CA (US); Manoj Ahluwalia, San Jose, CA (US); Jitendra Gaitonde, Cupertino, CA (US); Rajiv Sreedhar, Sunnyvale, CA (US); Ojas Milind Kale, Sunnyvale, CA (US); Mark Raymond Lubeck, San Jose, CA (US); Yuk Suen Cheng, Redwood City, CA (US); Suresh Rajanna, San Jose, CA (US); David Dvir Adler, San Jose, CA (US); Gary Nool, San Carlos, CA (US)

(73) Assignee: Fortinet, Inc., Sunnyvale, CA (US)

( * ) Notice: Subject to any disclaimer, the term of this patent is extended or adjusted under 35 U.S.C. 154(b) by 213 days.

(21) Appl. No.: 16/663,844

(22) Filed: Oct. 25, 2019

(65) Prior Publication Data
US 2021/0126948 A1 Apr. 29, 2021

(51) Int. Cl.
*H04L 9/40* (2022.01)

(52) U.S. Cl.
CPC .......... *H04L 63/20* (2013.01); *H04L 63/104* (2013.01); *H04L 63/1425* (2013.01)

(58) Field of Classification Search
CPC ... H04L 63/20; H04L 63/104; H04L 63/1425; H04L 63/105; H04L 63/0227; H04L 63/1408; G06F 2009/45595; H04W 24/08
See application file for complete search history.

(56) References Cited

U.S. PATENT DOCUMENTS

| 9,043,905 B1 * | 5/2015 | Allen | G06F 21/552 |
| | | | 726/22 |
| 9,276,919 B1 * | 3/2016 | Popoveniuc | H04L 63/1441 |

(Continued)

OTHER PUBLICATIONS

Hwang et al., "Selection of regression system tests for security policy evolution," 2012 Proceedings of the 27th IEEE/ACM International Conference on Automated Software Engineering Year: 2012 | Conference Paper | Publisher: IEEE.*

(Continued)

*Primary Examiner* — Roderick Tolentino
(74) *Attorney, Agent, or Firm* — HDC Intellectual Property Law, LLP

(57) ABSTRACT

Systems, methods, and apparatuses enable one or more security microservices to optimize a security configuration of a networked environment by applying security policies to resource groups passively to determine whether network sets, resource groups, or security policies should be modified, prior to active enforcement. When security policies are applied passively, security actions that are performed in response to a violation of security policy do not impact network traffic. The one or more security microservices evaluate the results of the passive application of security policies to determine whether there is at least one recommended modification to network sets, resource groups, or security policies. When there is at least one recommended modification, the modification is applied. When there are no recommended modifications or the recommended modifications have been performed, the one or more security microservices initiate active enforcement of at least a subset of the security policies on the network traffic.

21 Claims, 11 Drawing Sheets

(56) References Cited

U.S. PATENT DOCUMENTS

| | | | |
|---|---|---|---|
| 2003/0065758 A1* | 4/2003 | O'Sullivan | H04L 41/145 709/223 |
| 2011/0022192 A1* | 1/2011 | Plache | G05B 19/4188 700/28 |
| 2011/0131324 A1* | 6/2011 | Chaturvedi | H04L 63/1416 709/225 |
| 2013/0182722 A1* | 7/2013 | Vishveswaraiah | H04L 45/745 370/475 |
| 2018/0357385 A1* | 12/2018 | LaPorte | A61L 2/10 |
| 2019/0036882 A1* | 1/2019 | Ding | H04L 61/2557 |
| 2019/0150034 A1* | 5/2019 | Chen | H04L 41/5019 370/236 |

OTHER PUBLICATIONS

Lara et al., "Policy-Based Security Using Software-Defined Networking," IEEE Transactions on Network and Service Management Year: 2016 | vol. 13, Issue: 1 | Journal Article | Publisher: IEEE.*

\* cited by examiner

OPTIMIZING A SECURITY CONFIGURATION OF A NETWORKED ENVIRONMENT

TECHNICAL FIELD

Embodiments described herein generally relate to network security. Embodiments described herein generally relate to systems and methods for optimizing a security configuration of a networked environment.

BACKGROUND INFORMATION

Most businesses and organizations rely on computer systems and networks for an increasingly wide variety of business operations. As reliance on computing technologies has grown, so too has the importance of securing computer systems and networks against internal and external security threats. However, the breadth and complexity of security threats targeting such computer systems and networks is far and wide and ever growing. To monitor and address these security threats, organizations increasingly rely on sophisticated computer security applications and hardware such as firewalls, anti-virus tools, data loss prevention (DLP) software, etc.

BRIEF DESCRIPTION OF THE DRAWINGS

The various advantages of the embodiments disclosed herein will become apparent to one skilled in the art by reading the following specification and appended claims, and by referencing the drawings, in which:

DETAILED DESCRIPTION

Figure 1:
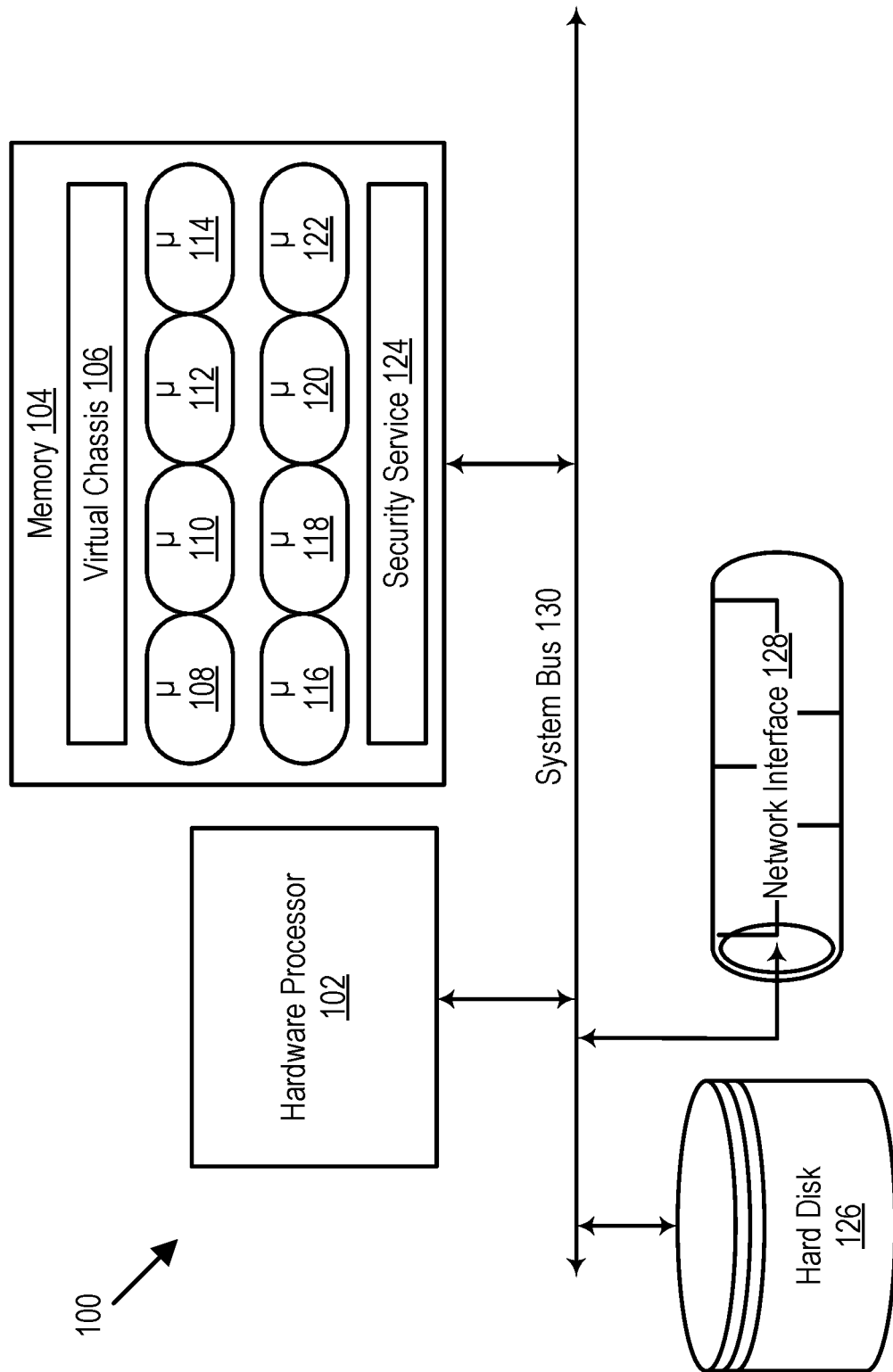
FIG. 1 is a block diagram of a network security system illustrating computer hardware, including a memory and processor, in accordance with the disclosed embodiments.

In the following description, numerous specific details are set forth. However, it is understood that embodiments of the disclosure may be practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Modern data centers and other computing environments can include anywhere from a few computer systems to thousands of systems configured to process data, service requests from remote clients and other applications, and perform numerous other computational tasks. The large number of interworking systems, applications, etc., make such computing environments susceptible to a wide variety of network security threats and other issues. A number of network security tools are available to protect such systems and the computer networks interconnecting these systems, and many of these tools comprise a monolithic set of network security functions. For example, a typical network security tool might comprise a hardware unit including firewall services, routing services, virtual private network (VPN) services, and so forth.

In order to mitigate the threats from security exploits, a security system utilizing a plurality of microservices can be implemented. In conventional systems, a network monitoring system is used to monitor traffic. In such systems, while in a monitoring mode, the network monitoring system gathers information about the network traffic. One issue that arises is determining how long to monitor and sample network traffic. For example, while sampling the network traffic for a short period of time can result in faster deployment (e.g., block network traffic that may be a security threat), it may not provide sufficient information to obtain a full picture of the computing environment, resulting in inefficient application of security. In contrast, sampling the network traffic for a longer period of time can result in obtaining a fuller picture of the computing environment, but can result in delays in deployment. In many situations, the length of time to sample network traffic required to obtain a sufficiently complete understanding of the network traffic can be difficult to determine (even by the system administrators). Further, the length of time to sample network traffic can also be variable as computing environments and the data they process change. For example, peripheral actions such as audits, backups, or restarts of application environments can render a sampling period poorly representative of normal traffic patterns.

To address the deficiencies of existing security infrastructures, embodiments detailed herein describe one or more security microservices that are configured to optimize the security configuration of a networked environment through passively applying security policies to live network traffic prior to initiating active enforcement of security policies. When security policies are passively applied, security actions that are triggered by the violation of the security policies do not impact network traffic. For example, these security actions can include logging the occurrences, generating and sending alerts or other notifications, etc. In contrast, security policies that are actively enforced or applied can impact network traffic (e.g., blocking or quarantining network traffic, etc.). By applying security policies passively, the security microservices can evaluate the results obtained from the passive application on live network traffic and determine any recommendations for modifying resource groups, network sets, and/or security policies. The modifications can be recommended in response to identifying that a security policy is over-inclusive (e.g., violations are triggered for both legitimate and non-legitimate traffic), a security policy is under-inclusive (e.g., little or no traffic triggers the security policy), a subset of resources in a resource group are disproportionately affected and modifications should be made to the resource group, etc.

FIG. 1 is a block diagram of network security system 100 illustrating computer hardware, including a memory (e.g., 104) and processor (e.g., 102), in accordance with the disclosed embodiments. Network security system 100 further includes a hard disk (e.g., 126) and network interface (e.g., 128). In one embodiment, hardware processor 102, memory 104, hard disk 126, and network interface 128 are coupled to each other via a system bus (e.g., 130). Network security microservices 108-122 are stored in memory 104 (e.g., volatile memory such as Random-Access Memory (RAM) and/or non-volatile memory such as solid-state storage or disk) and executed by one or more processor cores or hardware processor 102. Network security microservices 108-122, consisting of computer-executable instructions to perform one or more specific security services, are deployed based on configuration across available physical servers. Typically, each microservice receives a configuration and tasks via a backplane of a virtual chassis 106, and returns status, statistics, and other information to the backplane.

The data processed by the network security system 100 is transferred from a microservice to another (higher hierarchy) microservice using a data plane. In some embodiments, during such a transfer, a lower hierarchy microservice decides (based on configuration, current statistics, and other information) as to which next microservice to utilize. Such a decision may constitute a load-balancing decision to assure that the higher hierarchy microservices are efficiently utilized. In other embodiments, the decision of which microservice to utilize is made by a more central entity.

As illustrated, network security system 100 utilizes hardware processor 102 (such as a central processing unit (CPU) or one or more cores thereof, a graphics processing unit (GPU) or one or more cores thereof, or an accelerated processing unit (APU) or one or more cores thereof) to execute microservices and other applications (e.g., virtual chassis 106, security service 124, etc.) stored in memory 104. Network interface 128 (e.g., fabric or interconnect that is wired or wireless) provides a means for communicating with a data center. Network security system 100 may inspect traffic, detect threats, generate security settings and policies (e.g., access control lists), and otherwise protect a data center using the microservices 108-122.

Embodiments of network security system 100 providing the above capabilities are now discussed in more detail.

Network security system 100 adds security to, or enhances the security of, a datacenter or other computing environment. In one embodiment, network security system 100 is delivered (e.g., downloaded) in the form of a seed software application. The seed software application instantiates microservices of the network security system on a host in the datacenter. As used herein, a microservice container refers to where the microservice runs, for example, on a virtual machine. Once deployed, network security system 100 utilizes a hardware processor 102, memory 104, and network interface 128. In many scenarios, security can be added/configured using existing hardware and/or without purchasing additional rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

In some embodiments, network security system 100 utilizes a network interface 128 to explore the datacenter and to discover existing network segments, determine security settings and policies to apply to various network segments, detect available hosts and hardware resources, and determine additional configuration information as needed. In one embodiment, the datacenter itself includes several machines with hypervisors, or physical hardware, and the network security system 100 offers microservices to communicate with and protect one or more of those internal virtual machines or physical hardware. Based on performing datacenter discovery, network security system 100, in some embodiments, may then offer or suggest available security tools for selection either through a graphical interface or via connections with existing enterprise management software. In one embodiment, once configured, network security system 100 is deployed "in-line," receiving packets headed for the datacenter, thereby allowing network security system 100 to intercept and block suspicious traffic before it reaches the datacenter. With an understanding of the datacenter, network security system 100 deploys microservices to inspect traffic throughout the datacenter, and not only at ingress. In some embodiments, network security system 100 is deployed in a "copy only" configuration, in which the system monitors traffic, detects threats, and generates alerts, but does not intercept traffic before it arrives at the datacenter.

As shown, memory 104 has stored therein microservices 108, 110, 112, 114, 116, 118, 120, and 122 (108-122), as well as a virtual chassis 106, which may also be a microservice. In one embodiment, the microservices are small in size, consisting of a relatively small number of instructions. In one embodiment, the microservices 108-122 are independent of each other. As illustrated, microservices 108-122 are microservices that are loaded from memory and executed by the hardware processor 102. Those microservices 108-122 include data path security microservices, for example TCP/IP, SSL/TLS, DPI, or DLP microservices, as described further below with respect to FIGS. 2 and 3. The microservices 108-122 may also include management microservices, for example, a chassis controller to manage the microservices, a configuration microservice, an infrastructure discovery microservice, a database microservice to store data, a policy update microservice to receive policy updates from an external security cloud, and a compiler to receive policy data from various sources and to produce binary policy outputs to be used by the microservices, to name a few examples that are described hereinafter with respect to FIGS. 2 and 3.

Memory 104 also stores security service 124. Security service 124 is configured to manage the initialization and configuration of one or more of a plurality of microservices. For example, security service 124 is configured to initialize and configure a microservice (e.g., microservices 108-122) to manage the hardware and software resources in a datacenter or other computing environment by managing the creation and modification of security policies, network sets, and resource groups, based on sampling network traffic and the passive (and subsequently active) application of security policies to the resources in the computing environment. Security service 124 also configures interface microservices to perform security processing to ensure that appropriate security policies and/or rules are applied to the resources to mitigate the vulnerability of the resources to threats from various security exploits. The processes disclosed herein can be performed by security service 124 or by microservices (e.g., microservices 108-122) based on instructions from security service 124.

It will be understood by those of ordinary skill in the art that a datacenter typically employs many instances of the hardware represented within network security system 100 such as hardware processor 102 and memory 104. Individual servers may have multiple processors or multiple processing boards each with multiple processors. Processors may have a plurality of processing cores and access a plurality of network interfaces. Security service 124 comprises program code executing within a processor and may have interfaces (such as configuration or administration user interfaces) that are made available over a network to users. In a virtualized environment, the user may not be aware of the specific processor on which security service 124 is executing and, in some embodiments, that processor may change based on loading of the virtual environment. Such changes may occur based on administrator requests or automatically based on the virtual environment's control software.

In one embodiment, network security system 100 receives traffic via network interface 128 to/from a datacenter. In one embodiment, network security system 100 is placed in-line to inspect traffic, and potentially intercept a threat before it arrives at, or leaves, the datacenter. In other embodiments, network security system 100 monitors the traffic heading into, or out of, the datacenter, in which case network security system 100 detects threats and generates alerts but does not block the data. Hardware processor 102 may execute various data security microservices on the data. For example, as described hereinafter with respect to FIGS. 2 and 3, typically traffic first passes into and through a segment microservice, then a TCP/IP inspection microservice, then an SSL/TLS microservice, then a DPI microservice, then a NOX microservice, and then a DLP microservice. However, one or more of these services may not be enabled. In some embodiments, a segment microservice resides within a network segment and serves as the entry point for packets and forwards the packets to appropriate microservices for further analysis. Data path microservices as used herein refer to various microservices that inspect and analyze network traffic, such as TCP, TLS, DPI, NOX, and DLP microservices. A TCP microservice, for example, refers to a packet handling microservice able to process any layer 4-6 network packet and includes part of firewalling. A TLS microservice, for example, refers to a Transport Layer Security microservice, which decrypts/re-encrypts connections. A DPI microservice, for example, refers to a Deep Packet Inspection microservice and handles layer 7 inspection. A NOX microservice, for example, refers to a Network Object Extractor microservice, and works in conjunction with DPI to assemble objects from individual packets and to deliver the objects to other services. A DLP microservice, for example, refers to a Data Loss Prevention microservice, which detects and attempts to prevent data loss. Control path microservices, on the other hand, are various microservices, such as a factory, a compiler, a configuration, an infrastructure discovery, a database, a messenger, a scaler, and a chassis controller, that are instantiated in, and make up, a management plane. Threats detected by the aforementioned microservices, in one embodiment, are reported to a chassis controller microservice, which takes remedial action.

In one embodiment, microservices 108-122 are implemented using computer-executable instructions loaded from the Internet via network interface 128. For instance, in one embodiment, the microservices are implemented with computer-executable instructions downloaded from a web site or online store site. In some embodiments, microservices 108-122 are loaded into memory 104. In various embodiments, the microservices are implemented using computer-executable instructions loaded on and received from a non-transitory computer-readable medium, such as digital media, including another disc drive, a CD, a CDROM, a DVD, a USB flash drives, a Flash memory, a Secure Digital (SD) memory card, a memory card, without limitation. Microservices received from a digital medium may be stored into memory 104. The embodiments are not limited in this context. In further embodiments, a digital medium is a data source that constitutes a combination of hardware elements such as a processor and memory.

In most embodiments, network security system 100 runs on a datacenter computer. In other embodiments, however, network security system 100 is installed and runs on any one of a wide variety of computing platforms, ranging from low-cost to high-cost, and from low-power to high power. In some embodiments, network security system 100 runs on a server. In some embodiments, network security system 100 is installed on and runs on a low-cost, commodity server computer, or on a low-cost rack-mounted server. As illustrated, hardware processor 102 is a single core processor. In alternate embodiments, hardware processor 102 is a multi-core processor. In alternate embodiments, hardware processor 102 is a massively parallel processor. In some embodiments, a virtual chassis 106 and microservices 108-122 may be hosted on any of a wide variety of hardware platforms used in the datacenter to be protected.

In some embodiments, network security system 100 scales out using available resources to accommodate higher traffic or load. In one embodiment, hardware processor 102 (CPU) and memory 104 are scaled out or in dynamically as needed: additional CPUs and memory are added if scaling out, and some CPUs and/or memory are powered down if scaling in. This scaling out is performed to allocate the additional CPUs and memory to those portions of the security hierarchy for which there is demand, while not allocating additional CPUs and memory to those portions of the security hierarchy that can accommodate the higher traffic utilizing their existing allocation.

One property of a microservice is the separation and protection of memory from other microservices. In this manner, an individual microservice may be moved to another physical server or terminate abnormally without impacting other microservices. Microservices may be distinguished from threads in that threads generally operate within a shared memory space and exist within the confines of an operating system on which the microservices were spawned.

Figure 2:
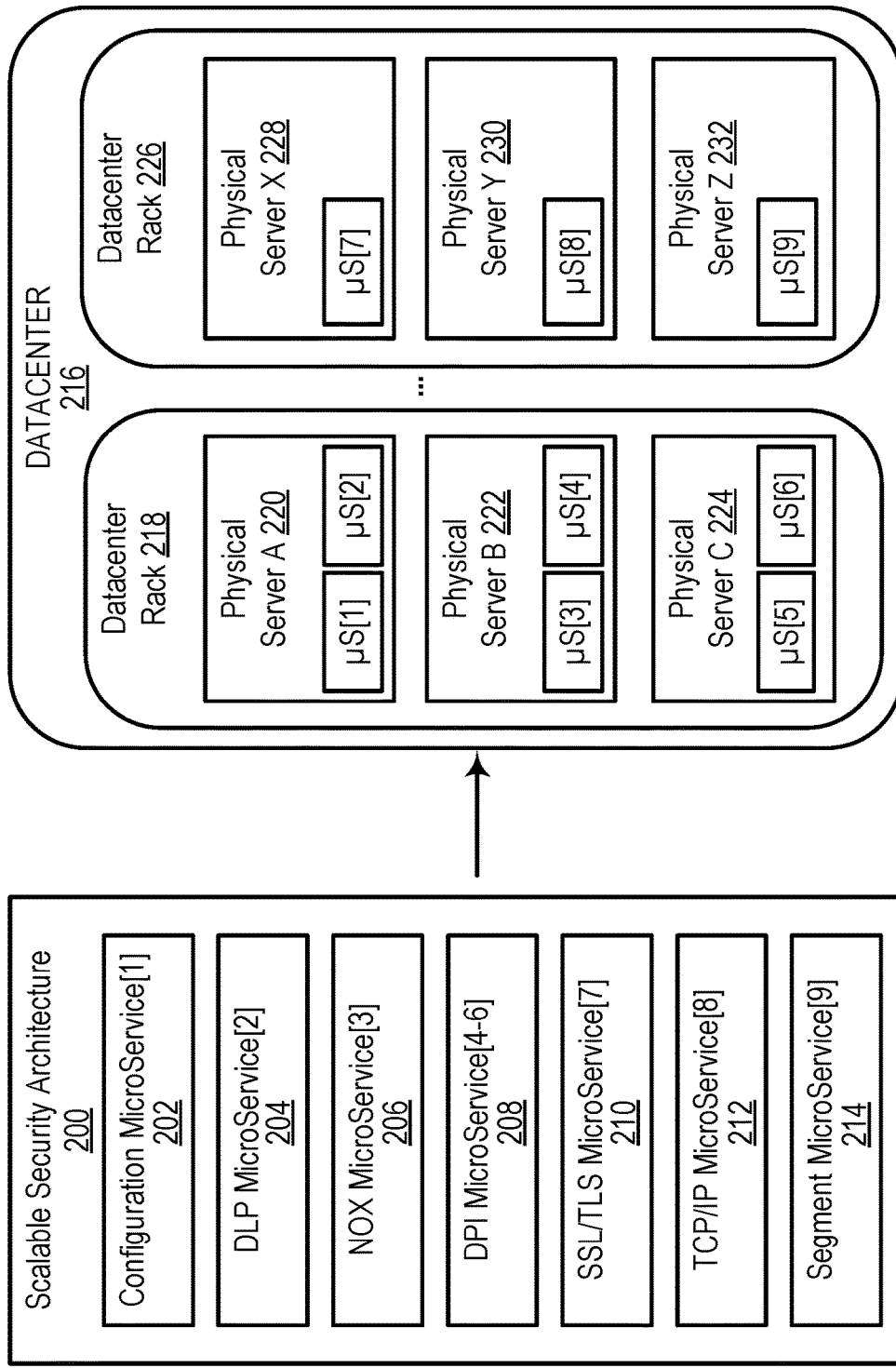
FIG. 2 illustrates a scalable security architecture implementing a three-time scale out using security microservices in accordance with the disclosed embodiments.

FIG. 2 illustrates an example scalable security architecture implementing a three-time scale out using security microservices. In the example of FIG. 2, only a single microservice (e.g., a DPI microservice) has a demand for additional resources. As shown, by utilizing a scalable microservice architecture 200, including DLP microservice 204, NOX microservice 206, DPI microservice 208, SSL/TLS microservice 210, TCP/IP microservice 212, and segment microservice 214, each level of the security service hierarchy can be scaled and configured independently to load balance the supply of processed data to the next hierarchy level. As shown, datacenter 216 includes datacenter rack 218, which includes physical server A 220, physical server B 222, and physical server C 224. As shown, a datacenter rack 226 includes physical server X 228, physical server Y 230, and physical server Z 232. DPI microservices 208 have been scaled out 3×, and in this instance assigned to be performed as microservices 4-to-6 on physical server B 222 and physical server C 224. The remaining microservices of scalable security architecture are shown as being implemented by physical servers A, X, Y, and Z (220, 228, 230, and 232, respectively). A configuration microservice 202 creates a configuration backplane and a data plane deployed as a software component on each physical server that is to receive security services. This process includes configuring routing rules, reserving network address space (such as a subnet), and configuring virtual environments to utilize portions of the reserved address space as gateways for network communication in and out of the servers to be secured. Both the backplane and data plane may thus be considered virtual networks managed by the security system. Security microservices may then utilize these networks to transmit packets, content, state, and other information among the microservices. The properties of the backplane and data plane are configured to reject packet traffic from outside the security system and to route information between microservices regardless of the physical server and virtual environment configuration.

Figure 3:
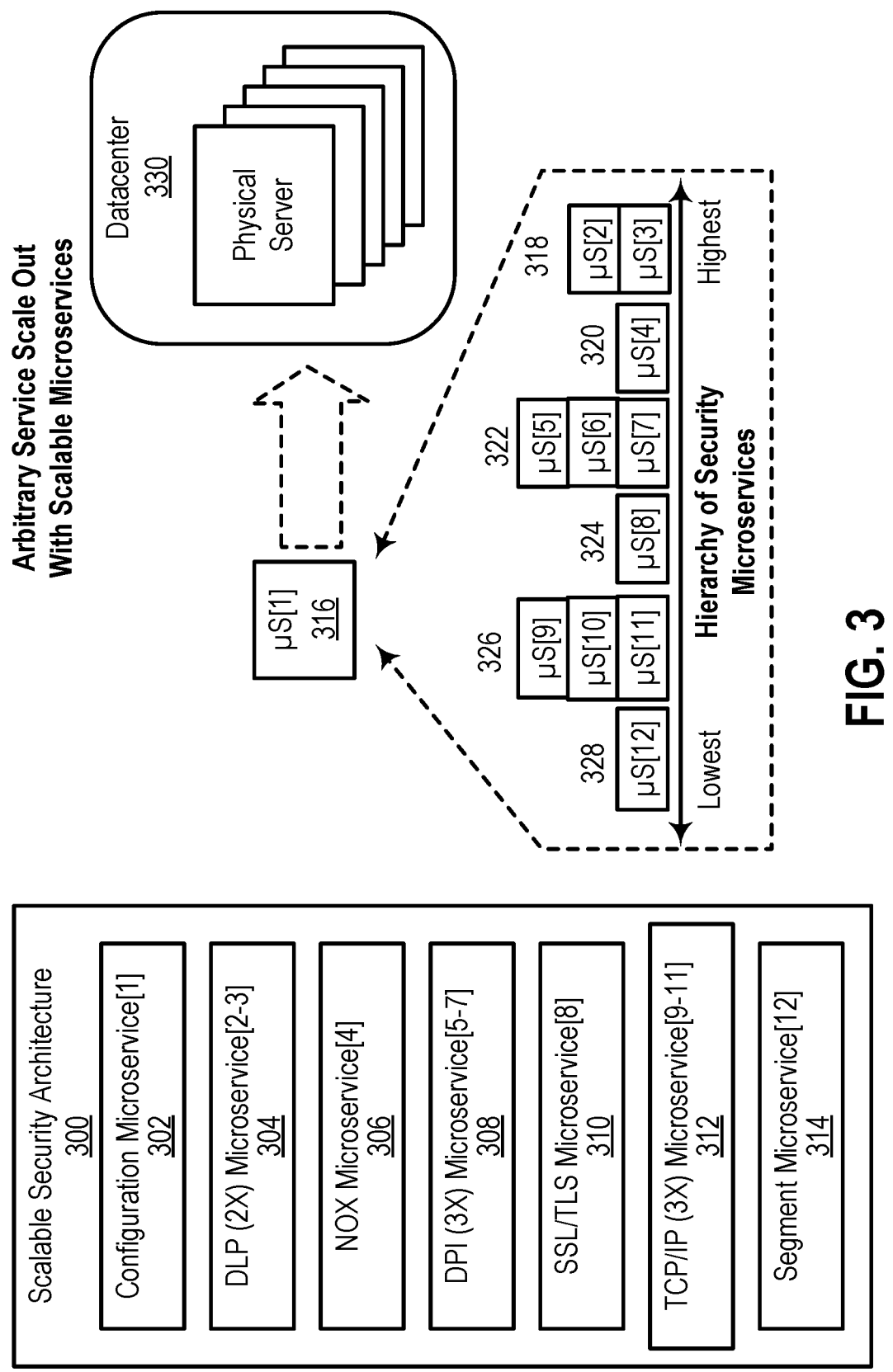
FIG. 3 illustrates an arbitrary scaling out of a microservice in accordance with the disclosed embodiments.

FIG. 3 illustrates an arbitrary scaling out of a microservice according to an embodiment. As shown, scalable security architecture 300 includes configuration microservice 302, DLP (2×) microservice 304 (a 2-times scale-out), NOX microservice 306, DPI (3×) microservice 308 (a 3-times scale-out), SSL/TLS microservice 310, TCP/IP (3×) microservice 312 (a 3-times scale-out), and segment microservice 314. As shown, configuration microservice 316 provisions (318, 320, 322, 324, 326, and 328) the 11 microservices from a lowest hierarchy to a highest hierarchy and configures them to communicate with each other via a backplane. The microservices, for example, may be implemented by physical servers in datacenter 330.

Figure 4:
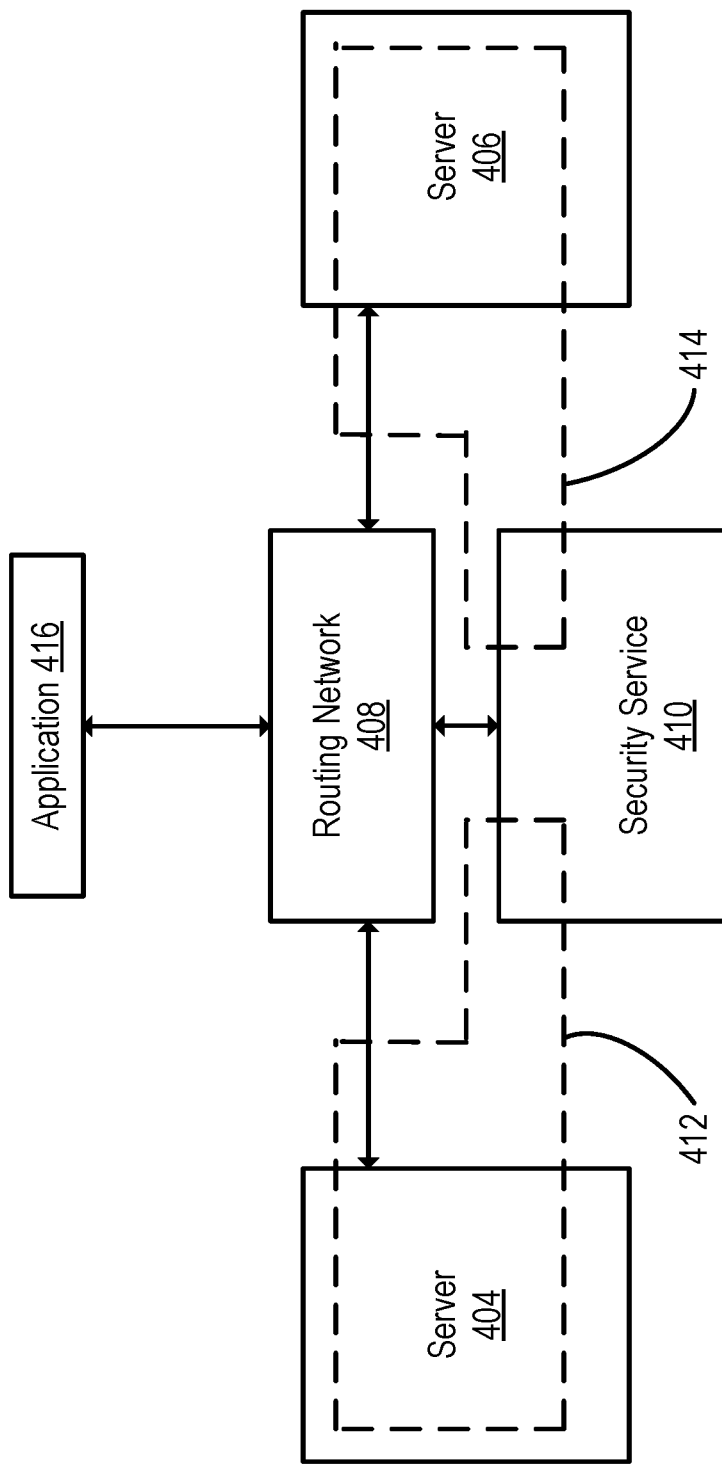
FIG. 4 is a block diagram illustrating a security service configured to monitor traffic sent among an application and one or more servers through a routing network in accordance with the disclosed embodiments.

FIG. 4 is a block diagram illustrating a networked computing environment in which an embodiment may be implemented. FIG. 4 represents an example embodiment that is provided for purposes of illustrating a clear example; other embodiments may use different arrangements.

The networked computer system depicted in FIG. 4 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In one embodiment, one or more security services 410 may be configured to monitor network traffic and other data sent between application 416 and one or more servers 404 and 406 through a routing network 408. In one embodiment, security service 410 is an example of security service 124 in FIG. 1. In one embodiment, security service 410 comprises one or more "microservices" (e.g., microservices 108-122 in FIG. 1) used to monitor and perform various actions relative to data items (e.g. network traffic, files, email messages, etc.) sent to and received from one or more applications 416 and servers 404 and 406. The microservices comprising security service 410 do not need to be confined to one physical server such as a server 404 and 406. For example, one or more microservices of the security service 410 may be executed on server 404 and other microservices of the security service 410 are executed on 406. In some embodiments, the security service 410 is executed on a different server from one or more servers for which the security service is responsible for monitoring and protecting. In one embodiment, servers 404 and 406, security service 410, and application 416 are deployed in a networked environment. Examples of networked environments include data centers, an on-premise stack, and a set of servers remotely connected using a network.

In one embodiment, a routing network 408 provides connectivity among servers 404 and 406, security service 410, and application 416. In some embodiments, routing network 408 is partially configured responsive to hypervisor configuration of servers 404 and 406. In some embodiments, a routing network 408 is partially or entirely configured responsive to hypervisor configuration of servers 404 and/or 406.

In one embodiment, based on routing information included in channel data encapsulation packets, data traveling between an application 416 and server 404 and/or server 406 is routed to the correct server, and is kept separate from data traveling between the application 416 and the other server. Accordingly, what is essentially a private network 412 may be created between the server running security service 410 and server 404. Similarly, what is essentially a private network 414 may be created between the server running security service 410 and server 406.

Figure 5:
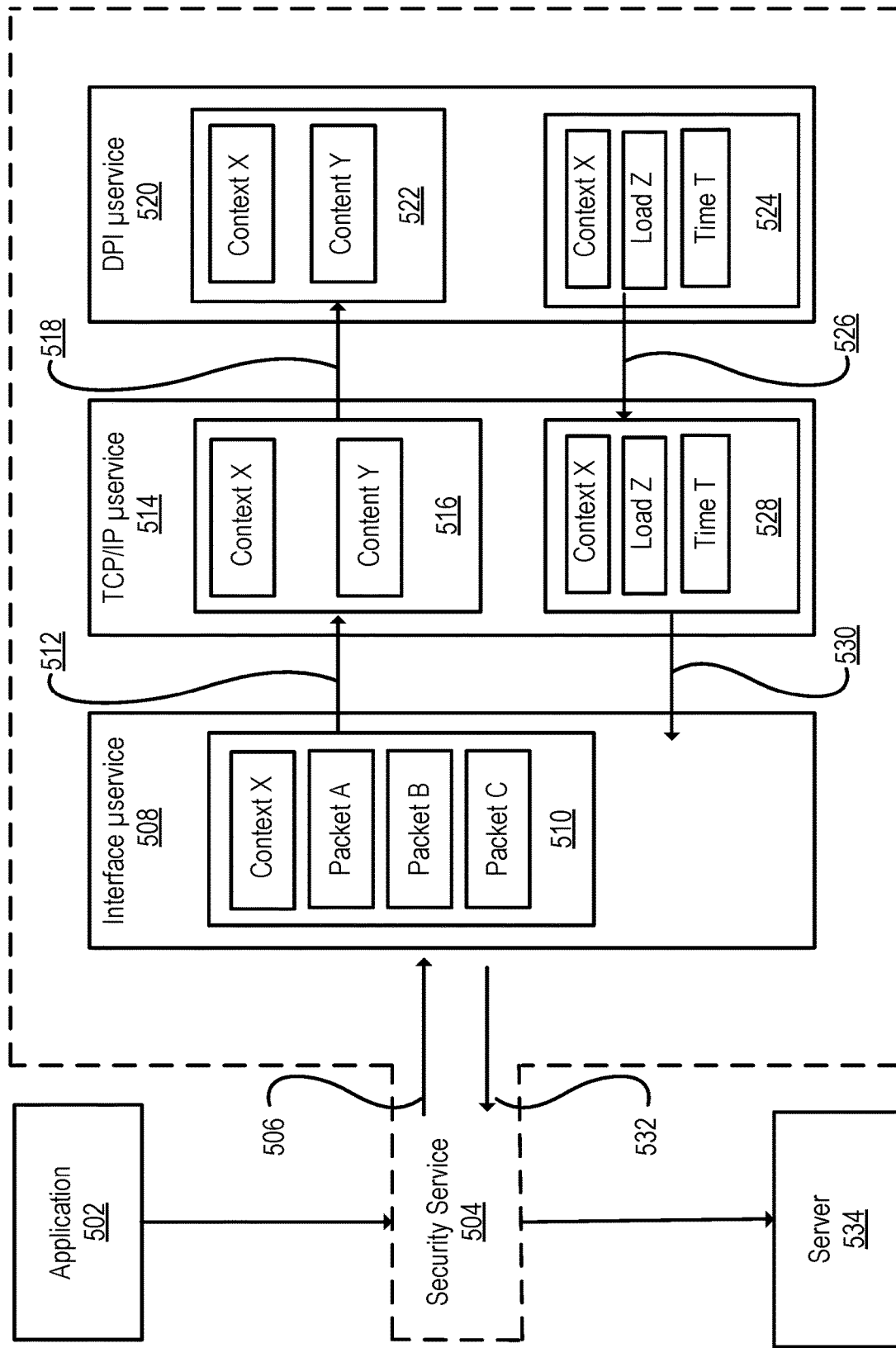
FIG. 5 is a block flow diagram illustrating application data traversing to a server after passing through a hierarchy of security microservices in accordance with the disclosed embodiments.

FIG. 5 is a block flow diagram illustrating application data traversing to a server after passing through a hierarchy of security microservices according to an embodiment. As illustrated, the flow begins with security service 504 receiving a network packet from application 502. In one embodiment, security service 504 is an example of security service 124 in FIG. 1. Security service 504 receives the packet (e.g., from an application or program that redirects packets to security service 504), and security service 504 forwards 506 the packet to interface microservice 508, which generates a channel data encapsulation packet 510 encapsulating three packets A, B, and C, and a context X. As shown, channel data encapsulation packet 510 encapsulates three packets, but in alternate embodiments, the number of encapsulated packets may vary without limitation. In some embodiments, context X is generated based at least on the headers of packets A, B, and C. In some embodiments, context X is generated based on a lookup of packet header fields such as IP addresses, ports, and MAC addresses for the source and destination of the packets. In some embodiments, the generation of context X includes using an interface identifier obtained from a virtualization environment. Generation of context X may be accomplished through a lookup of header fields and other data in a table, a hash of header fields and other data, or another method whereby packets for which a common security policy is to be applied are associated with a common context or common portion, such as a bit field, of the context.

Context X may be considered an identifier describing the traffic streams, source machines, or applications responsible for generating packets A, B and C. This identifier may be direct (such as an ID used as a table look up), indirect (such as a pointer used to access a data structure), or some other method of instructing microservices as to the policies and processing to use for handling packets A, B, and C. As an example, context X may be generated by performing a hash, longest prefix match, or lookup of header fields such as IP addresses, TCP ports, interface names (or MAC addresses), or other packet properties. The lookup may be an exact match, longest prefix match, or other method to associate packet streams with the same security processing to use. The generated context may then be used by security services, such as a DPI service, to determine which rules to utilize when scanning the data from packets A, B, and C (and other packets that are part of the same traffic stream). This information may be embedded within the context (as a bit field or other information), available by indirection (such as a table or data structure lookup by another service) or generated programmatically based on any combination of such information.

The context may be generated through a look up at an interface microservice and is included in the transmission of packet data to transmission control protocol (TCP) reassembly services. Reassembled content from the TCP microservice is transmitted to a deep packet inspection (DPI) microservice or secure socket layer (SSL/TLS) microservice, and with the same context. By maintaining this context in the encapsulation of data transport throughout the microservice hierarchy, processing directives associated with a context become a shared read-only resource (relative to the microservices) and may only rarely use stateful updates.

Interface microservice 508 transmits 512 the channel data encapsulation packet 510 to TCP/IP microservice 514. As shown, the channel data encapsulation packet 516 includes context X and content Y, which corresponds to packets A, B, and C of channel data encapsulation packet 510. After conducting security processing of the channel data encapsulation packet 516, TCP/IP microservice 514 transmits 518 the packet to DPI microservice 520. As shown, the channel data encapsulation packet 522 includes context X and content Y, which corresponds to packets A, B, and C of channel data encapsulation packet 510. After conducting security processing of the channel data encapsulation packet 522, DPI microservice 520 generates channel data encapsulation packet 524, which, as shown, includes context X, DPI load Z, and DPI timestamp T. Encapsulated channel data may be tagged with properties including a timestamp and a load metric. The timestamp may reference the duration of microservice processing, the time at which microservice processing started or another temporal property associated with processing the encapsulated channel data. The load metric may reference the relative or absolute loading of a microservice processing the encapsulated channel data.

As shown, a DPI microservice 520 transmits, via path 526, channel data encapsulation packet 524 to TCP/IP microservice 514, which uses the DPI load and DPI timestamp information to inform future load-balancing decisions. As shown, a TCP/IP microservice 514 generates channel data encapsulation packet 528, which includes context X, TCP/IP load Z, and TCP/IP timestamp T. As shown, TCP/IP microservice 514 transmits, via path 530, channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits the packets to a server 534.

As shown, DPI microservice 520 transmits channel data encapsulation packet 524 to TCP/IP microservice 514, which uses the DPI load and DPI timestamp information to inform future load-balancing decisions. As shown, TCP/IP microservice 514 generates channel data encapsulation packet 528, which includes context X, TCP/IP load Z, and TCP/IP timestamp T. As shown, TCP/IP microservice 514 transmits channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits them to server 534 microservice.

Exemplary benefits of the security service 504 may include the ability of each microservice to utilize the same channel data encapsulation protocol for all communication, thereby allowing scaling across the entirety of the datacenter network routable via the channel data encapsulation header. Communications between microservices maintain a context X generated at interface microservice 508 to all subsequent microservices that no longer have access to the original packets. As an example, a DPI microservice processing content reassembled by a TCP/IP microservice has no visibility into the packets used by the TCP/IP microservice to reassemble the content. However, the context X generated upon reception of one or more of those packets at the interface microservice, forwarded to the TCP/IP microservice and subsequently forwarded by the TCP/IP microservice to the DPI microservice, may be used to determine policy or select a minimal DPI signature set by the DPI microservice without incurring additional state processing. By providing load and timestamp data in the channel data encapsulation packets 524 and 528, which are returned via transmission paths 526 and 530, the microservices receive and can maintain real-time loading and processing latency information utilized to make load balancing decisions.

Figure 6:
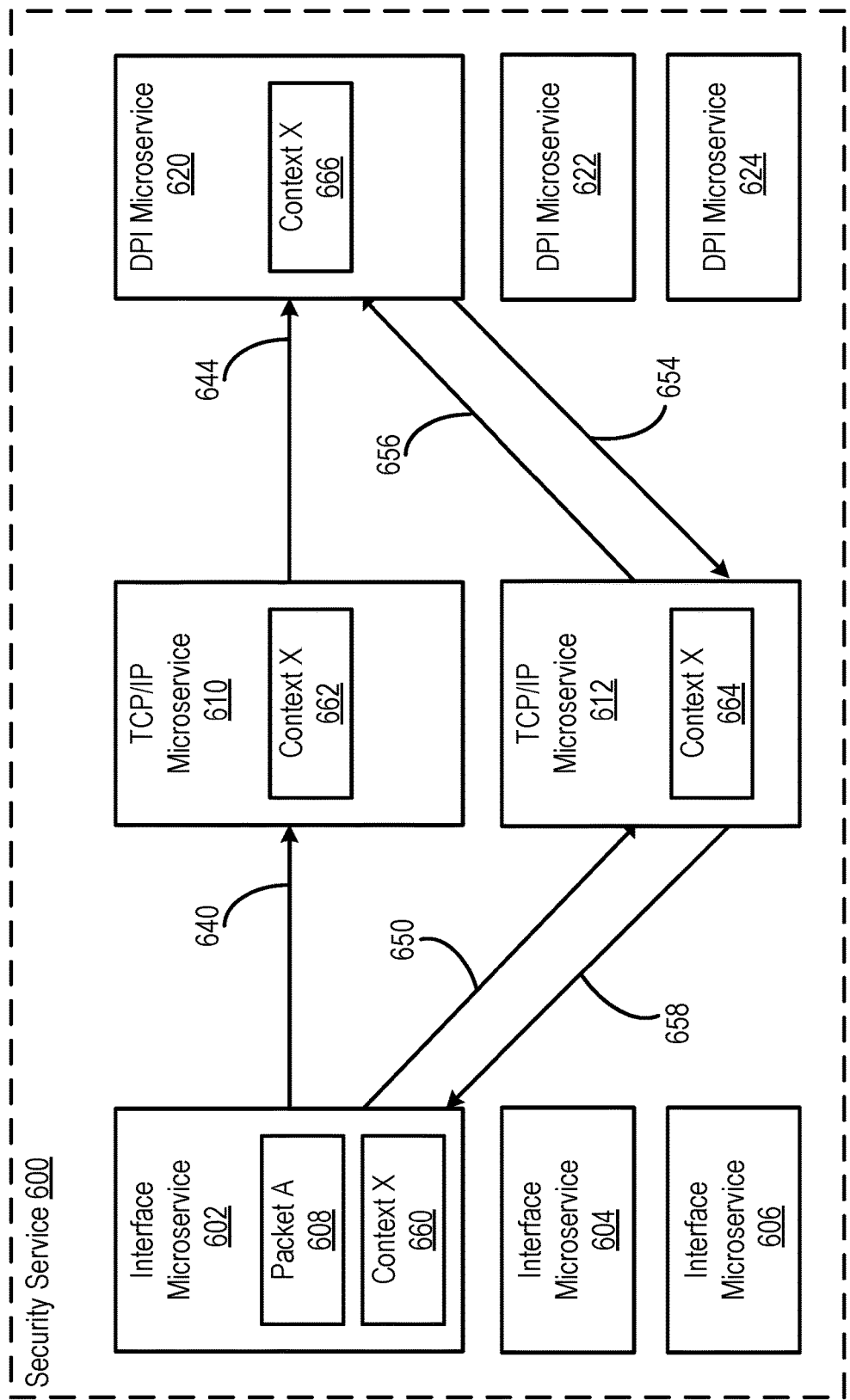
FIG. 6 is a flow of application data through a stateless processing, fault-tolerant microservice environment in accordance with the disclosed embodiments.

FIG. 6 is a block diagram illustrating a flow of application data through a stateless processing, fault-tolerant microservice environment in accordance with disclosed embodiments. As illustrated, security service 600 includes interface microservices 602, 604, and 606, TCP/IP microservices 610 and 612, and DPI microservices 620, 622, and 624. Other examples include a different number of microservices and/or a different number of microservice types. In one embodiment, security service 600 is an example of security service 124 in FIG. 1. In the example of FIG. 6, an interface microservice 602 receives packet A 608, and generates a context X 660.

One benefit of the security system illustrated in FIG. 6 is the handling of state. For example, if packets belong to a certain context X, the security service 600 may enable both TCP/IP microservices 610 and 612 to perform meaningful work on the packets. By implementing TCP/IP processing as microservices 610 and 612 with an external state structure and a context that accompanies processed data, each TCP/IP microservice, and any other microservice at every level of the security hierarchy, can be isolated from other microservices and can be scaled independently. Each microservice can access the state for any packet or reassembled packet data, thereby enabling real-time load balancing. In many cases, the context enables microservices to forego consulting service state (state associated with processing at the hierarchy level of the specific microservice), thereby reducing the demands on the global state repository.

As an example, consider the context X 662 obtained by TCP/IP microservice 610 as part of packets received from interface microservice 602 as transmission path 640. Context X 662, when transmitted to DPI microservice 620 as part of transmission path 644, along with the reassembled packet data, contains information that may enable the DPI microservice to forego or simplify processing of this reassembled data. Such information can include, for example, a context bit or field specifying a subset of regular expressions or patterns to be used for DPI processing, a number of bytes of reassembled data to be received before beginning DPI processing, specific allowed or disallowed protocols, and other information potentially avoiding a DPI state lookup.

In an embodiment, microservices of a security service 600 are stateless. For example, each of the microservices may retrieve state information from an outside source such that the microservice can process packets or content belonging to any context. Each microservice may retrieve and update service state (that state associated with the microservice processing). Additionally, each microservice may retrieve and update context state (state associated with the context relevant for all security service processing). In some embodiments, the process state and context state share a global state service. Examples of elements of context state include a level of suspicion regarding traffic from a source IP, a policy to ignore certain ports or protocols, and other information used to process the packets, reassembled content, and extracted objects from communication identified with the context.

In an embodiment, multiple microservices in the same or different hierarchy of the security system may be able to process packets associated with the same context at the same time. If one security microservice fails (e.g., if a TCP microservice fails to respond to a request), another microservice can take over and process the request using the failed microservice's context.

Returning to FIG. 6, the generation of context X 660 may include considering properties associated with a packet A 608 (e.g., such as an n-tuple detailing routing information), and a state lookup or a context lookup, in addition to other information. Interface microservice 602 provides packet A 608 and context X 660 to TCP/IP microservice 610 or 612 via transmission paths 640 or 650, respectively. For example, interface microservice 602 may conduct a load-balancing to select one of the TCP/IP microservices to forward the packet A 608 and the context X 660.

In an embodiment, TCP/IP microservices 610 and 612 are stateless, but may benefit from the context X generation performed by interface microservice 602. For example, whichever of TCP/IP microservices 610 and 612 receives packet A may disassemble the packet to extract the data associated with the packet and conduct security processing on the data. TCP/IP reassembly generally consists of associating packets with flows (e.g., identified by source and destination IP and port values) and using the TCP sequence numbering to place the packets into a correct order, remove any overlap or duplication, and/or identify missing or out of order packets.

In FIG. 6, TCP/IP microservices 610 or 612 forward the extracted data and/or the data resulting from the security processing to DPI microservice 620 via transmission paths 644 or 656, respectively. Along with the transmitted data, TCP/IP microservice 610 or 612 forwards context X 662 or 664, respectively, to DPI microservice 620. In some embodiments, context X 660, 662, 664, and 666 are substantially identical.

In an embodiment, DPI microservice 620 is also stateless and may use the context provided by TCP/IP microservice 610 or 612 in transmission 644 or 656. DPI microservice 620 may load DPI processing state before processing the received data, but can perform some work (e.g., scheduling different DPI pattern state tables) based on the context. Transmitting the context to the DPI microservice therefore may obviate some amount of work by the DPI microservice. If TCP/IP microservice 610 fails and interface microservice 602 instead utilizes TCP/IP microservice 612, DPI microservice 620 may obtain the context from the transmission of reassembled TCP content in transmission 656.

Although FIG. 6 does not show a second packet, when a subsequent packet associated with the same context is received, interface microservice 602 may conduct a load balancing and select one of the TCP/IP microservices to forward the packet along with context X 660. In one embodiment, interface microservice 602 chooses to forward the second packet to TCP/IP microservice 612 via transmission path 650. TCP/IP microservice 612 performs some security processing, then transmits the second packet and context X 664 to DPI microservice 620 via transmission path 656. After performing some security processing, DPI microservice 620 responds to TCP/IP microservice 612 via transmission path 654, and TCP/IP microservice responds to interface microservice 602 via transmission path 658.

Summarizing the operation of an embodiment as illustrated by FIG. 6, an interface microservice transmits packets to a TCP/IP microservice along with a context that has been generated based on the contents of the packets. The transmission comprises a request to perform a security service (e.g., TCP/IP reassembly) for the packets to generate reassembled data. The TCP/IP microservice consults the received context to determine whether to obtain a context state, service state, or both, from a state repository to perform the security service. Reassembly is performed by the TCP/IP microservice, any modified state returned to the state repository and the reassembled data transmitted, along with the context, to a DPI microservice as a request to perform DPI processing.

Continuing the example illustrated by FIG. 6, the DPI microservice receives the reassembled data and context from the request to perform DPI security services transmitted by the TCP/IP microservice. The DPI microservice consults the received context to determine whether to obtain a context state, service state, or both, from a state repository to perform its security service. DPI inspection may be performed by the DPI microservice, any modified state returned to the state repository, and a response sent to the TCP/IP microservice.

Figure 7:
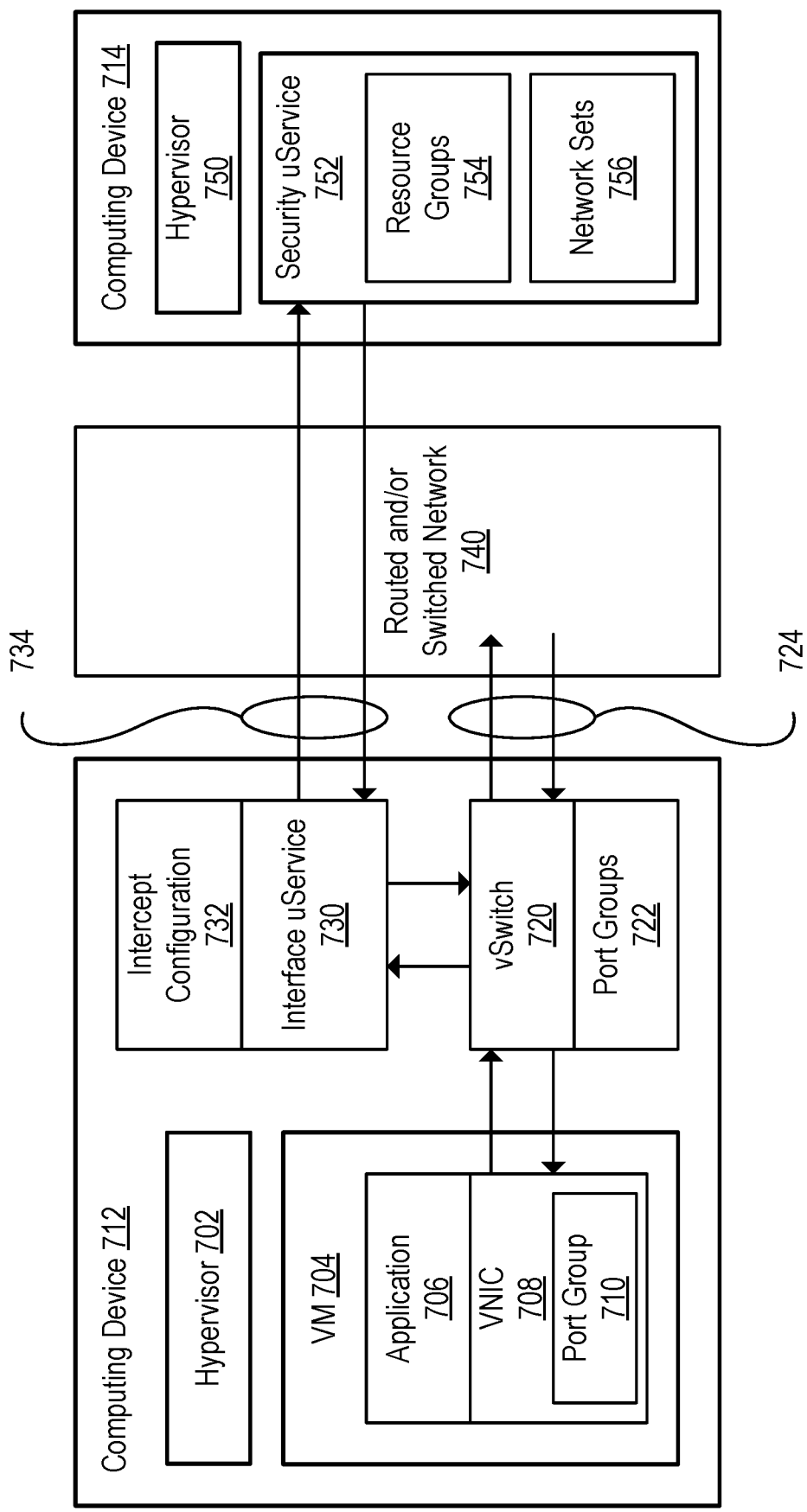
FIG. 7 is a block diagram illustrating an example system for intercepting network traffic for security processing and configuration in accordance with the disclosed embodiments.

FIG. 7 is a block diagram illustrating an example system for intercepting network traffic for security processing and configuration in accordance with the disclosed embodiments. In an embodiment, the system of FIG. 7 includes at least one computing device 712 coupled to at least one other computing device 714 via a routed and/or switched network 740. The routed and/or switched network 740, for example, can be a network within a data center interconnecting various types of devices within the data center, or any other type of network connecting computing devices 712, 714. Computing devices 712 and 714 include processing hardware and memory, the memory storing software to be executed by the processing hardware. FIG. 7 represents an example embodiment that is provided for purposes of illustrating a clear example; other embodiments may use different arrangements.

In an embodiment, the computing device 712 includes a hypervisor 702, vSwitch 720, and an interface microservice 730. The hypervisor 702 is a component implemented in software, hardware, firmware, or combinations thereof, and which manages the creation and operation of one or more virtual machines (VMs) (e.g., a VM 704). Hypervisors 702 and 750, VM 704, and vSwitch 720 are implemented using software stored in the memory of computing device 712 and/or 714 and executed by the processing hardware. In some embodiments, hypervisor 702 and the VMs it supports/manages (e.g., VM 704) are located on computing device 712. In other embodiments, hypervisor 702 and VM 704 are located on different physical machines or computing devices. In FIG. 7, interface microservice 730 on computing device 712 intercepts network traffic routed by vSwitch 720. In one embodiment, interface microservice 730 can be a single microservice or multiple microservices (e.g., microservices 108-122 from FIG. 1). In some embodiments, vSwitch 720 and port groups 722 are integrated into or otherwise part of hypervisor 702, configured via hypervisor 702, or some combination thereof.

In an embodiment, a VM 704 managed by hypervisor 702 is any type of emulated computer system that can share hardware resources with one or more other VMs managed by hypervisor 702. In the example of FIG. 7, a VM 704 includes at least one application 706 and at least one virtual network interface card (VNIC) 708. Examples of an application 706 include, but are not limited to, an operating system, a system application, and a user application.

In an embodiment, the VM 704 is one of a plurality of VMs networked as part of a virtual network. The plurality of VMs can be networked in part using one or more vSwitches (e.g., vSwitch 720). Whereas a physical Ethernet switch manages network traffic between machines on a physical network, a vSwitch manages network traffic between VMs logically connected to virtual ports of the vSwitch. A vSwitch can be connected to other vSwitches and to one or more physical switches (not shown in FIG. 7) using physical Ethernet adapters to join virtual networks with physical networks. For example, the network path 724 might connect the vSwitch 720 to a routed and/or switched network 740 via one or more physical switches.

In an embodiment, a VNIC 708 of a VM 704 is connected to a port of the vSwitch 720, and the port can be assigned to a port group 710. In one embodiment, port group 710 represents a port group identifier or another value indicating a specific port group. At a high level, a port group is a vSwitch configuration which defines a logical grouping of VNICs connected to the ports comprising the group. For example, the system of FIG. 7 can include any number of VMs 704 having any number of VNICs 708, and the VNICs can be grouped into any number of port groups by the vSwitch 720. A port group can be further associated with configuration options applied to the member ports including, for example, bandwidth limitations, traffic shaping rules, and other settings. In an embodiment, a vSwitch 720 stores configuration information related to port groups as port groups configuration 722. For example, when a vSwitch 720 receives a packet from a VNIC 708 of a VM 704, the vSwitch 720 can determine which port group 710 the VNIC 708 is associated with and tag the packet with a VLAN assigned to the port group in the port groups configuration 722.

An interface microservice 730 enables network traffic sent to and received from a VM 704 (and any other VMs generating network traffic routed by vSwitch 720) to be intercepted and filtered based on an intercept configuration 732. As shown in FIG. 7, an interface microservice 730 can optionally send, via network path 734, intercepted network traffic to a security microservice 752 running on a computing device 714. In one embodiment, the security microservice 752 can be a single microservice or multiple microservices (e.g., microservices 108-122 from FIG. 1). In one embodiment, the security microservice 752 is configured or implemented by a security service (e.g., security service 124 in FIG. 1). The computing device 714 includes a separate hypervisor 750 and may further include any number of VMs managed by hypervisor 750 (not shown). In other examples, the interface microservice 730 can perform various security operations locally as a security service at the computing device 712 without sending the intercepted network traffic to security microservice 752.

In one embodiment, the security microservice 752 is configured to manage resources running on computing devices 712 and/or 714 using the properties of resource groups 754. In one embodiment, resource groups 754 is a data structure storing metadata and information about each resource group and the resources contained in each resource group. In one embodiment, resources include database servers, web servers, virtual machines, storage servers, etc. In such embodiments, the metadata in resource groups 754 includes resource identifiers, version identifiers, policies and permissions associated with each resource group member, etc. For example, security microservice 752 provides security services for the monitored VM 704 wherein the selection or configuration of services is based, at least in part, on the resource group (one of research groups 754) to which VM 704 belongs. This membership may determine the types of services, the aspects of security policies the services enforce, the level of alerts, warnings or actions taken based on policy violations, or other aspects of service configuration.

In one embodiment, security microservice 752 performs security functions based on the properties of resource groups 754. For example, if resource groups 754 contains metadata identifying the members of resource groups 754 as database servers, security microservice 752 applies security processing (such as content scanning, DLP, antivirus, etc.) designated for database servers. Alternatively, if resource groups 754 contains metadata identifying the members of resource groups 754 as processing personally identifying information, security microservice 752 applies content scanning configured to identify social security numbers, credit card numbers, etc.

In one embodiment, each resource group in resource groups 754 includes resource members that have an identical or substantially similar set of security policies and rules applied to them, e.g., because the resource members in the same resource group perform the same functions or run the same or similar applications. In another embodiment, each resource group includes resource members of the same type. For example, a first resource group can be composed of database servers, a second resource group can be composed of web servers, etc. In some embodiments, after grouping the resources into a resource group, the security microservice 752 applies a specific set of security policies and rules to the resource members of the resource group. In one embodiment, when a new server is created or implemented, the security microservice 752 identifies the type of the new server, assigns the new server to the specific resource group having the same types of servers as the new server, and assigns the policies of the specific resource group to the new server.

In one embodiment, security microservice 752 is also configured to manage network sets. In one embodiment, a network set is a network-based definition of a grouping of resources in a computing environment. In one embodiment, whereas membership in resource groups is based on the functions, applications and similar aspects of resources, membership in network sets is based on network properties of resources, such as virtual environment port groups, VLANs, etc. In one embodiment, network sets 756 is a data structure storing metadata and information about each network set and the grouping of resources contained in each network set.

In one embodiment, whereas the initial specification of resource groups may come from the application owner or administrators, the initial specification of network sets may come from the virtual environment or network administrator. As shown in FIG. 7, VM 704 runs application 706 and is assigned port group 710. These group definitions are known by security microservice 752 (via inclusion in resource groups 754 and network sets 756) and can thus be used to determine aspects of security policy.

In one embodiment, the specification of application type as the resource group type and the port group as the network set for a particular VM is sufficient for initial evaluation but inappropriate for security policy enforcement. For example, initial classification of all database servers as a resource group precludes the opportunity to enforce different policies on different types of databases (e.g., personal information databases, logging databases, etc.). Similarly, the assignment of each port group to different network sets precludes the opportunity to group similar port groups together and administer them collectively. Although there is no "correct" assignment for any particular network configuration, there can be some configurations that are more manageable than others and some initial configurations can prove intractable to manage. The ability of a security microservice (e.g., security microservice 752) to increase or decrease the granularity of resource groups 754 and/or network sets 756 provides the means to address this issue.

In some embodiments, the specification of resource groups and network sets allows increased flexibility in determining how long to sample network traffic and can minimize the effect of repeated or prolonged sampling on a subset of virtual machines. For example, if the application owners or administrators are not in control of backup or audit functionalities within a specific port group, efficiency can be gained by splitting the port group over two network sets and sampling the traffic for each network set independently. In most deployments, the configuration of manageable resource groups is dependent on achieving sufficient and representative sampling. It is thus desirable to optimize network set configuration to provide optimal sampling and optimize resource group configuration to provide optimal security policy flexibility.

Figure 8:
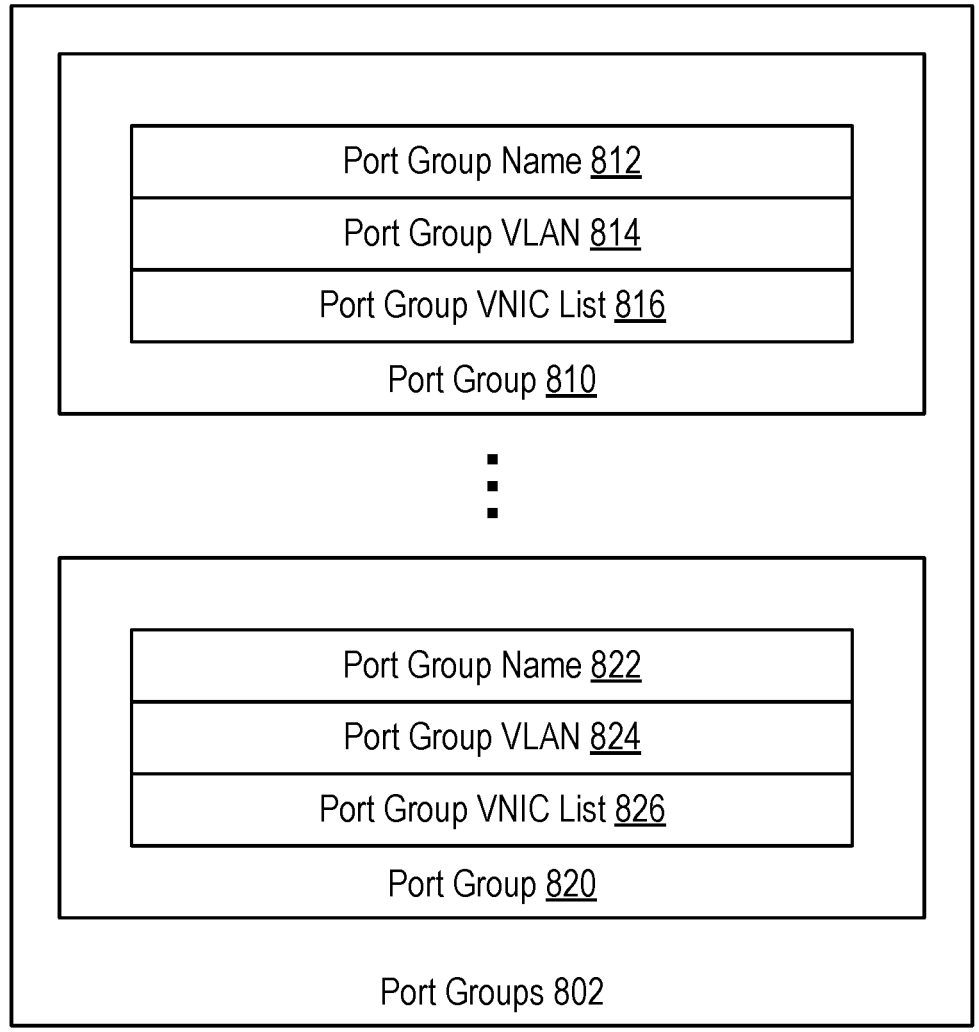
FIG. 8 is a block diagram illustrating example port group configurations in accordance with the disclosed embodiments.

FIG. 8 is a block diagram illustrating example port group configurations in accordance with the disclosed embodiments. For example, the port groups configuration 802 shown in FIG. 8 includes the port group definitions 810, 820. In one embodiment, a port group definition includes a port group name (e.g., port group name 812, 822), a port group VLAN (e.g., port group VLAN 814, 824), and a port group VNIC list (e.g., port group VNIC lists 816, 826). A port group name is an optional label for the port group, the port group VLAN identifies a VLAN associated with the port group, and the port group VNIC list identifies a set of VNICs belonging to the port group. In one embodiment, the port group configurations shown in FIG. 8 are an example of the port group configuration data stored in port groups configuration 722 stored at a vSwitch 720, as shown in FIG. 7.

Figure 9:
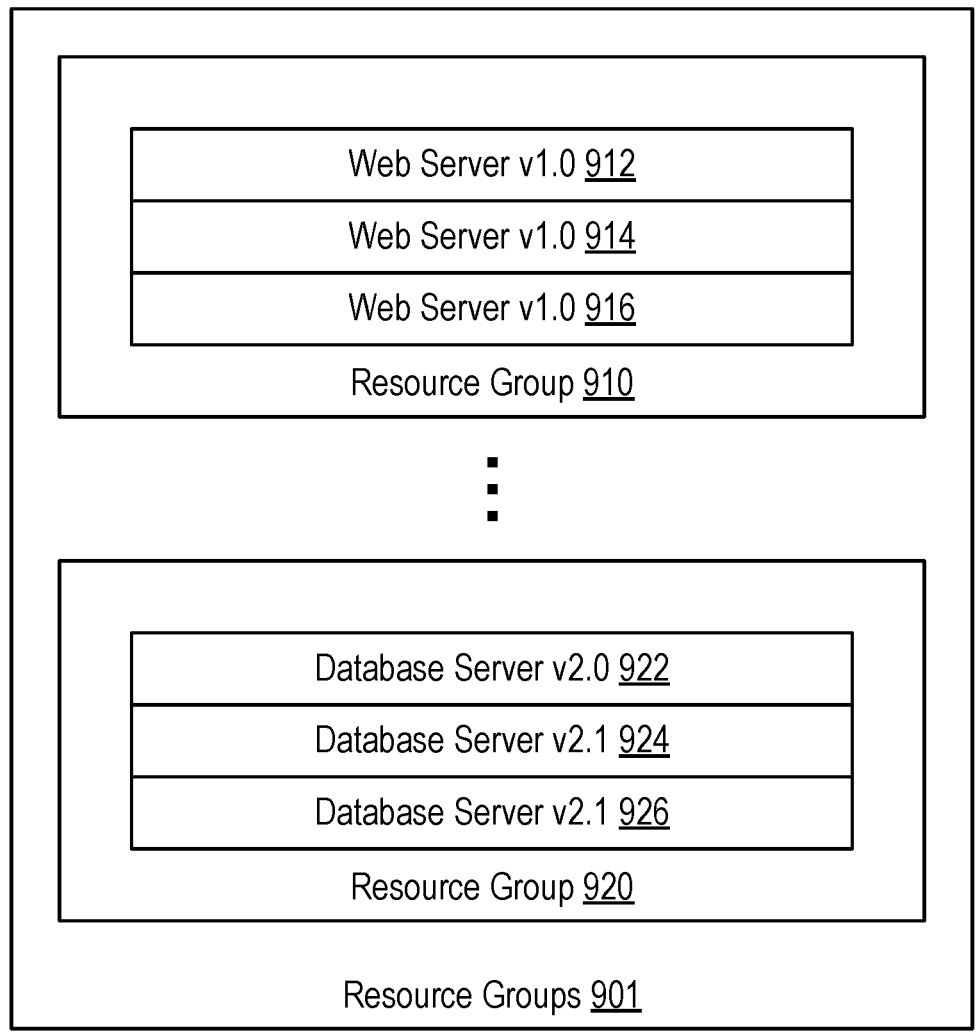
FIG. 9 is a block diagram illustrating example resource groups managed by a security microservice in accordance with the disclosed embodiments.

FIG. 9 is a block diagram illustrating example resource groups managed by a security microservice in accordance with the disclosed embodiments. In one embodiment, resource groups 901 is an example of resource groups 754. In the example in FIG. 9, resource group 910 includes a plurality of web servers 912-916, and resource group 920 includes a plurality of database servers 922-926. The resources (e.g., servers) within a resource group can be at the same patch level or be at different patch levels. For example, each of web servers 912-916 are running version 1.0 of a particular program or application, while in resource group 920, database server 922 is running version 2.0 of a particular program or application and database servers 924-926 are running version 2.1 of a particular program or application.

Figure 10:
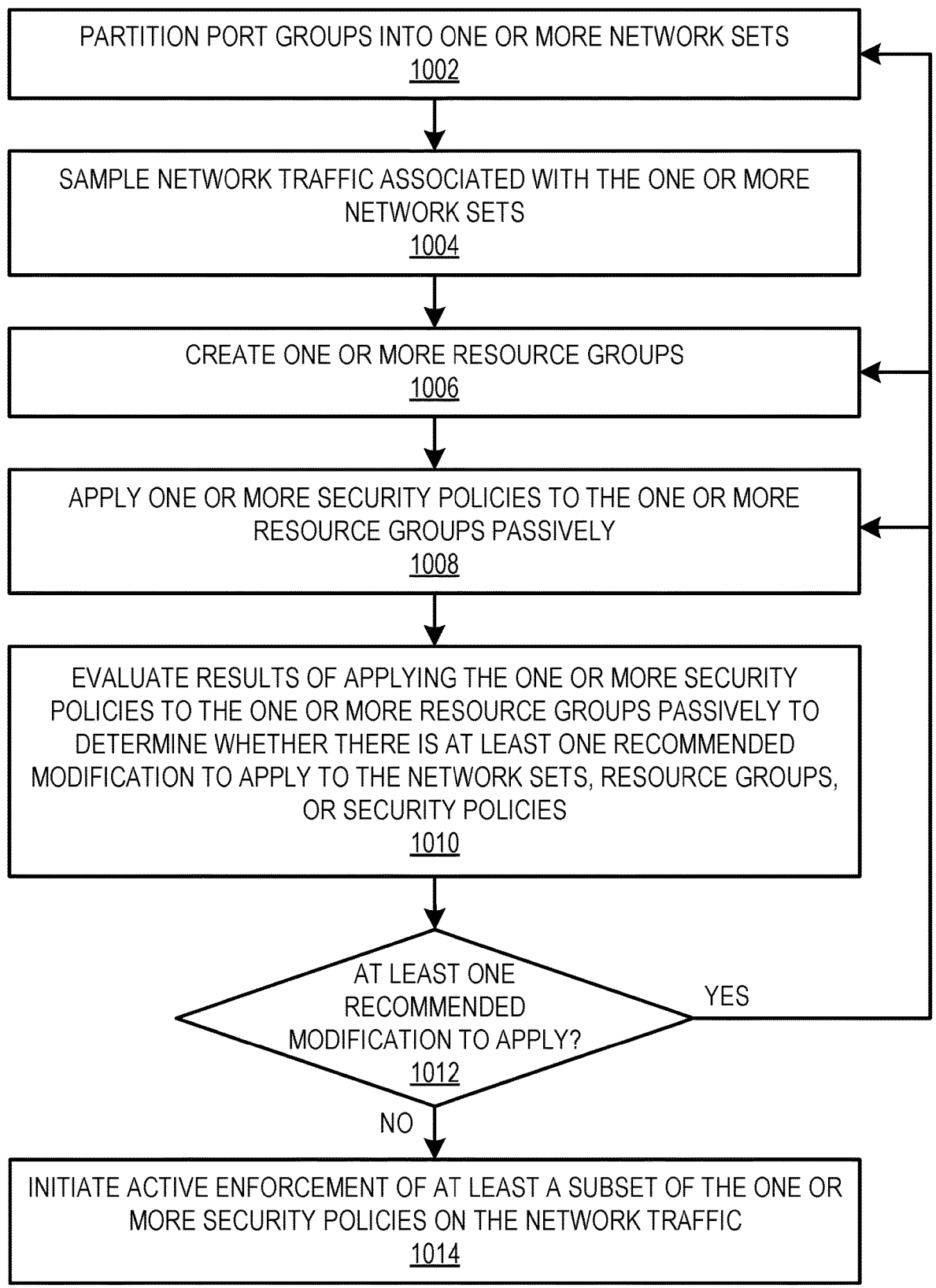
FIG. 10 is a flow diagram illustrating a process for modifying a security configuration of a networked environment based on a passive application of security policies in accordance with an embodiment.

FIG. 10 is a flow diagram illustrating a process for modifying a security configuration of a networked environment based on a passive application of security policies in accordance with an embodiment. For ease of understanding, the description of FIG. 10 below references components of the networked environments of FIGS. 1 and 7, however, it is not limited to those components. In one embodiment, a security microservice (e.g., security microservice 752) performs the actions described below. In another embodiment, the security microservice is configured or instructed to perform the actions described below (e.g., by a security service such as security service 124 in FIG. 1). Further, a single security microservice may perform an action, or two or more security services may perform the action either independently, or in conjunction. Although FIG. 10 describes operations performed by one or more security microservices (e.g., microservices 108-122), some or all of the operations described in FIG. 10 can be performed by one or more management microservices, one or more configuration microservices, another type of microservice, an application, or any other computer-executable logic.

At block 1002, a security microservice partitions port groups into one or more network sets. In one embodiment, the security microservice is an example of security microservice 752 in FIG. 7. In one embodiment, a network set is comprised of a designated grouping of port groups (e.g., the network set is a hierarchy over port groups). In one embodiment, each port group in a computing environment is a separate network set. In such embodiments, the security microservice can automatically partition each port group into a separate network set. In one embodiment, the port groups within a single network set are grouped together based on type or network properties. In some embodiments, the security microservice partitions a set of port groups into a single network set based on textual properties (e.g., all port groups labeled "test*" grouped into a network set, etc.). In other embodiments, security microservice port groups are partitioned into one or more network sets in response to receiving instructions for partitioning port groups. Given a computing environment with 20 different port groups, it can be advantageous to associate port groups together in a smaller number of network sets.

The term "port group" is a label that can be used to indicate one or more virtual ports that are interconnected in that they are able to receive broadcasts from each other. In some embodiments, virtual machines attached to different port groups are not able to communicate with one another using the switch to which they are attached and on which the port groups are defined as they are perceived to be on different networks.

At block 1004, the security microservice samples network traffic associated with the one or more network sets. In one embodiment, the security microservice gathers information and properties of the network traffic directed to and from the members of the one or more network sets. In one embodiment, the information and properties of the network traffic include IP addresses, endpoints, networks, subnets, protocols, applications, logins, etc. Properties of the network traffic also include the type of network traffic, the source of network traffic, the destination of network traffic, etc.

In one embodiment, the security microservice samples network traffic for a predetermined amount of time. In another embodiment, the security microservice samples network traffic until the security microservice has sampled an established amount of network traffic.

At block 1006, the security microservice creates one or more resource groups. Initial resource groups may be based on function (web, application, database, etc.) or other properties of the applications running on the VMs. In some embodiments, the port groups identified at block 1002 are selected based on usage environments (such as production, development, testing, etc.), while the resource groups created at block 1006 are created based on functions within each environment (such as the described web, application, database, etc.) Such embodiments benefit from the recognition that the same function may exhibit significant performance and usage differences among different environments. In some embodiments, the resource group's applications are discovered through initial sampling of network traffic on the network sets through means such as pattern matching, port usage, behavioral analysis, connectivity or other methods. In some embodiments, the grouping is performed based on instructions or configurations from system administrators or application owners. In some embodiments, system administrators or application owners may use the results of the network set sampling to inform their decisions.

For example, based on sampling the network traffic, the service microservice can identify all the servers associated with marketing users, and place the identified servers in a separate resource group. In another example, the service microservice can identify all the servers running a database application, and place the identified servers running the database application in a separate resource group.

At block 1008, the security microservice applies security policies to the one or more resource groups passively. In some embodiments, applying security policies passively is achieved by not enabling or enforcing those policies to affect the traffic via blocking or other similar active means (e.g., quarantine, rewrite, etc.). As a general example, a given security policy deployed or applied passively may generate an alert or notification upon identification of a policy violation as opposed to blocking traffic (upon identification of the same policy violation) when deployed or applied actively.

In one embodiment, security policies are designed and specified with the goal of being applied to a certain group of servers. For example, security policies designed to prevent credit card records from being extracted from database servers will be designed to identify credit card records in data streams and will be intended to be applied to servers that maintain or process credit card records. For an environment in which administrators are concerned about the security of credit cards records, one or more resource groups would be created comprising those servers (e.g., databases) maintaining or processing credit card records and the security policies containing rules identifying and monitoring credit card records would be applied to those resource groups.

The security policies can include access control lists (ACLS) for resources within the networked environment. In one embodiment, applying the security policies passively can include running the security policies against live network traffic in a monitoring or testing only mode. For example, the security microservice applies the security policies to the resource groups passively by monitoring the network traffic directed to and from the resource groups and identifying any violations of security policies. However, the security microservice does not perform a security action (e.g., mitigation, etc.) in response to identifying violations of security policies. Instead, the security microservice logs or sends alert messages and notifications corresponding to identified violations of security policies for future reference, identification, and/or analysis.

In one embodiment, the security microservice passively applies the security policies to the network traffic for a predetermined amount of time. In another embodiment, the security microservice passively applies the security policies to the network traffic until the security microservice has sampled an established amount of network traffic.

At block 1010, the security microservice evaluates the results of applying the one or more security policies to the one or more resource groups passively to determine whether there is at least one recommended modification to apply to the network sets, the resource groups or the security policies. In one embodiment, evaluating the results from applying the one or more security policies to the one or more resource groups passively includes generating statistical data, e.g., identifying the number of violations of security policies, the number of security policies implicated, the resources identified as violating security policies, etc.

There are multiple methods of evaluating results in order to determine that a recommendation for modifying security configurations may be appropriate. In some embodiments, a comparison of the number of policy violations is made against a threshold. Examples of recommendations that the security microservice can provide include merging network sets or resource groups, cleaving network sets or resource groups, modifying rules or security policies, adding or removing rules or security policies, restarting a process, adding a server to a whitelist, etc. For example, if a particular security policy is triggered by too much network traffic or is not triggered by any network traffic, the security microservice can recommend removing the particular security policy or not activating the particular security policy for enforcement (e.g., maintain in a monitoring mode). For example, a security policy having a number of violations greater than or equal to a predefined threshold value may be recommended to be disabled or not configured for active enforcement because the security policy may be too sensitive and falsely identify too much network traffic. In another example, a security policy having a number of violations less than a predefined threshold may be recommended to be disabled, because the security policy is not identifying enough network traffic to be considered useful, or recommended to be altered (e.g. applied more strictly), because the security policy is failing to identify expected traffic (such as test traffic or known existing traffic that is known to match the policy but is also known to not be a security issue).

In some embodiments, the number of violations across different resource groups is used to evaluate the results of the application of passive security policies. For example, a security policy for which all or a majority of violations are isolated to a specific resource group may be recommended to be disabled for other resource groups.

In some embodiments, the number of violating members in a specific resource group is used to evaluate the results of the application of passive security policies. For example, a resource group for which all or a large proportion of violations are concentrated on a subset of group members may be recommended to be split into two resource groups based on whether each member contributed to the violations (e.g., violating group members in a first resource group and non-violating group members in a second resource group).

In some embodiments, the number of security policies violated by two or more resource groups is used to evaluate the results of the application of passive security policies. If two or more resource groups violate substantially the same security policies at substantially the same rate, the resource groups may be recommended to be merged.

In some embodiments, the number of security policies violated by multiple resource groups within a network set and the statistical spread (e.g., standard deviation) of violations by both number and security policy is used to evaluate the results of the application of passive security policies. If both the number of violations and the statistical spread are above respective thresholds, the security microservice can generate a recommendation to split the network set and resample to recreate resource groups.

In some embodiments, the number of applications identified during sampling and the number and type of security policy violations of two or more network sets is used to evaluate the results of the application of passive security policies. If the applications identified are substantially the same and the number and type of security policy violations are substantially the same, the security microservice can generate a recommendation to merge the network sets and resample to recreate resource groups.

In one embodiment, the security microservice generates a recommendation that a network set is too large and/or includes too many different types of machines. In such embodiments, the security microservice generates a recommendation that affects how port groups are partitioned into network sets (e.g., in block 1002). For example, a network set called "application tier" includes web servers, application servers, middleware servers, database servers, management servers, and rendering farm servers, where the rules are being applied to all the members of the "application tier" network set, even though this particular network set includes different classes and types of machines and devices. The same rules being applied to a variety of different devices can result in problems. Continuing the example, after evaluating the results of applying the passive security policies, the security microservice identifies or records 20,000 violations, all related to the rendering farm. In other words, the violations or security policies/rules are asymmetrically clustered to a particular member or type of member of the "application tier" network set. In this example, the security microservice can identify that all of the security policy violations are from the rendering farm and recommend splitting the "application tier" by extracting the rendering farm into its own network set. This allows fewer rules to be applied to the remaining members of the "application tier" network set.

In another example, when the security microservice determines that network traffic has only been sampled from 11 of 12 database servers within a computing environment, the security microservice recommends returning to block 1004 for additional sampling of the network traffic.

At block 1012, the security microservice determines whether there is at least one recommended modification to apply based on the evaluation of the results. If the security microservice does not recommend any modifications, or all previously determined or identified recommended modifications have been implemented, the flow proceeds to block 1014. If the security microservice does recommend any modifications, the flow proceeds to an earlier block in the process depicted in FIG. 10.

Based on the recommendation, the flow proceeds to the appropriate block associated with the recommendation. For example, when the security microservice recommends modifying network sets, the flow proceeds to block 1002. Such a recommendation indicates that sampling should be restarted in view of changes in network sets. In another example, when the security microservice recommends a modification to the security policies applied to the resource groups, the flow proceeds to block 1008. Such a recommendation indicates that passive policy evaluation should be restarted in view of changes in security policies. In another example, when the security microservice recommends modifying the membership of a resource group (e.g., because the security microservice identified a high number of alerts or ACL violations from the application of passive security policies in block 1008), the flow proceeds to block 1006. In one embodiment, the security microservice determines a number of alerts or ACL violations to be a high number when they exceed a predetermined threshold amount or percentage within a given period of time.

At block 1014, the security microservice initiates active enforcement of at least a subset of one or more of the security policies on the network traffic. When the security microservice does not recommend any modifications to network sets, resource groups, and/or security policies, the security microservice initiates enforcement of the security policies on the network traffic. Initiating active enforcement of a security policy includes enabling security actions that impact network traffic associated with the resource groups in response to a determined violation of the security policy. In such embodiments, the actively enforced security policies can include none, some, or all of the security policies that were previously only passively applied to network traffic in block 1008. In some embodiments, the actively enforced security policies can include modified versions of some or all the security policies that were previously only passively applied to network traffic in block 1008.

In one embodiment, the active enforcement of the security policies can include sending network traffic to a security microservice to perform security processing prior to sending the network traffic to its intended destination or copying the network traffic and performing security processing in parallel or after sending the network traffic to its intended destination. In some embodiments, security operations can include performing TCP reassembly and deep packet inspection. Enforcement of security policies can also include blocking network traffic, quarantining network traffic, adding sources of network traffic to a blacklist or whitelist, etc. In some embodiments, the security microservice also performs the security actions that would be performed when the security policies are performed passively (e.g., logging data regarding the policy violation, sending alerts/notifications, etc.).

According to one embodiment, the techniques described herein are implemented by one or more special-purpose computing devices. The special-purpose computing devices may be desktop computer systems, portable computer systems, handheld devices, networking devices or any other device that incorporates hard-wired logic, program logic, or both, to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 11:
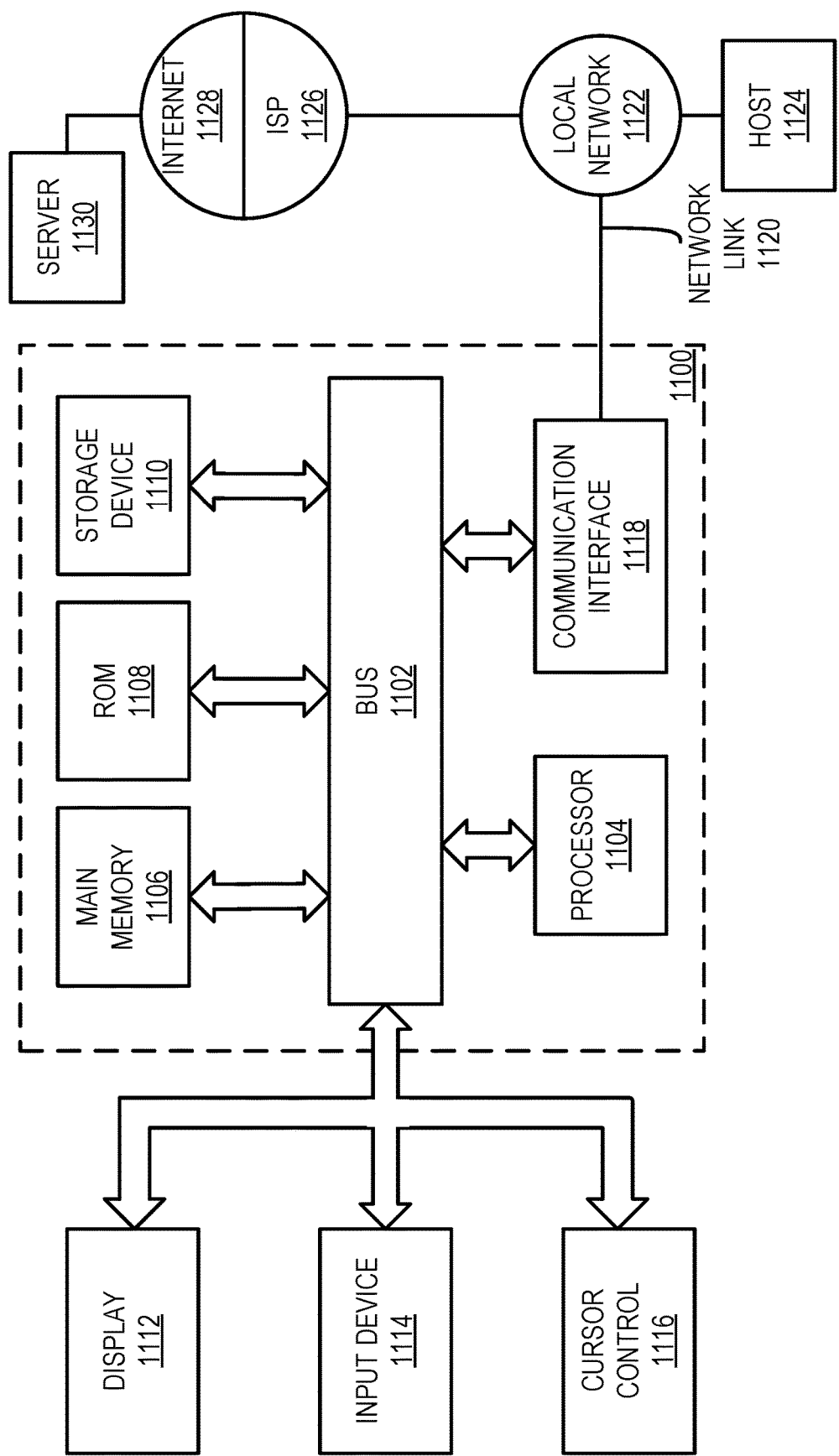
FIG. 11 is a block diagram that illustrates a computer system utilized in implementing the above-described techniques in accordance with some of the disclosed embodiments.

FIG. 11 is a block diagram that illustrates a computer system 1100 utilized in implementing the above-described techniques in accordance with some of the disclosed embodiments. Computer system 1100 may be, for example, a desktop computing device, laptop computing device, tablet, smartphone, server appliance, computing mainframe, multimedia device, handheld device, networking apparatus, or any other suitable device.

Computer system 1100 includes one or more buses 1102 or other communication mechanism for communicating information, and one or more hardware processors 1104 coupled with buses 1102 for processing information. Hardware processors 1104 may be, for example, general purpose microprocessors. Buses 1102 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1100 also includes a main memory 1106, such as a random-access memory (RAM) or other dynamic or volatile storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 a special-purpose machine that is customized to perform the operations specified in the instructions.

Computer system 1100 further includes one or more read only memories (ROM) 1108 or other static storage devices coupled to bus 1102 for storing static information and instructions for processor 1104. One or more storage devices 1110, such as a solid-state drive (SSD), magnetic disk, optical disk, or other suitable non-volatile storage device, is provided and coupled to bus 1102 for storing information and instructions.

Computer system 1100 may be coupled via bus 1102 to one or more displays 1112 for presenting information to a computer user. For instance, computer system 1100 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1112 may include, without limitation, plasma display devices, projectors, cathode ray tube (CRT) monitors, electronic paper, virtual reality headsets, braille terminal, and/or any other suitable device for outputting information to a computer user. In one embodiment, any suitable type of output device, such as, for instance, an audio speaker or printer, may be utilized instead of a display 1112.

One or more input devices 1114 are coupled to bus 1102 for communicating information and command selections to processor 1104. One example of an input device 1114 is a keyboard, including alphanumeric and other keys. Another type of user input device 1114 is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. Yet other examples of suitable input devices 1114 include a touch-screen panel affixed to a display 1112, cameras, microphones, accelerometers, motion detectors, and/or other sensors. In one embodiment, a network-based input device 1114 may be utilized. In such an embodiment, user input and/or other information or commands may be relayed via routers and/or switches on a Local Area Network (LAN) or other suitable shared network, or via a peer-to-peer network, from the input device 1114 to a network link 1120 on the computer system 1100.

A computer system 1100 may implement techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or a solid-state drive of a remote computer. The remote computer can load the instructions into its dynamic memory and use a modem to send the instructions over a network, such as a cable network or cellular network, as modulate signals. A modem local to computer system 1100 can receive the data on the network and demodulate the signal to decode the transmitted instructions. Appropriate circuitry can then place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

A computer system 1100 may also include, in one embodiment, one or more communication interfaces 1118 coupled to bus 1102. A communication interface 1118 provides a data communication coupling, typically two-way, to a network link 1120 that is connected to a local network 1122. For example, a communication interface 1118 may be an integrated services digital network (ISDN) card, cable modem, satellite modem, or a modem to provide a data communication connection to a corresponding type of telephone line. As another example, the one or more communication interfaces 1118 may include a local area network (LAN) card to provide a data communication connection to a compatible LAN. As another example, the one or more communication interfaces 1118 may include a wireless network interface controller, such as an 802.11-based controller, Bluetooth controller, Long Term Evolution (LTE) modem, and/or other types of wireless interfaces. In any such implementation, communication interface 1118 sends and receives electrical, electromagnetic, or optical signals that carry digital data streams representing various types of information.

Network link 1120 typically provides data communication through one or more networks to other data devices. For example, network link 1120 may provide a connection through local network 1122 to a host computer 1124 or to data equipment operated by a service provider. Internet Service Provider (ISP) 1126, which may be an example of a service provider, in turn provides data communication services through a wide area network, such as the world-wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

In one embodiment, computer system 1100 can send messages and receive data, including program code and/or other types of instructions, through the network(s), network link 1120, and communication interface 1118. In the Internet example, a server 1130 might transmit a requested code for an application program through Internet 1128, ISP 1126, local network 1122 and communication interface 1118. The received code may be executed by processor 1104 as it is received, and/or stored in storage device 1110, or other non-volatile storage for later execution. As another example, information received via a network link 1120 may be interpreted and/or processed by a software component of the computer system 1100, such as a web browser, application, or server, which in turn issues instructions based thereon to a processor 1104, possibly via an operating system and/or other intermediate layers of software components.

In one embodiment, some or all of the systems described herein may be or comprise server computer systems, including one or more computer systems 1100 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In one embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In one embodiment, the cloud-based components may be implemented by third-party entities, on behalf of another entity for whom the components are deployed. In other embodiments, however, the described systems may be implemented entirely by computer systems owned and operated by a single entity.

In one embodiment, an apparatus comprises a processor and is configured to perform any of the foregoing methods. In one embodiment, a non-transitory computer-readable storage medium, storing software instructions, which when executed by one or more processors cause performance of any of the foregoing methods.

Although some embodiments disclosed herein involve data handling and distribution in the context of hardware execution units and logic circuits, other embodiments can be accomplished by way of a data or instructions stored on a non-transitory machine-readable, tangible medium, which, when performed by a machine, cause the machine to perform functions consistent with at least one embodiment. In one embodiment, functions associated with embodiments of the present disclosure are embodied in computer-executable instructions. The instructions can be used to cause a general-purpose or special-purpose hardware processor that is programmed with the instructions to perform the steps of the at least one embodiment. Embodiments of the present invention may be provided as a computer program product or software which may include a machine or computer-readable medium having stored thereon instructions which may be used to program a computer (or other electronic devices) to perform one or more operations according to the at least one embodiment. Alternatively, steps of embodiments may be performed by specific hardware components that contain fixed-function logic for performing the steps, or by any combination of programmed computer components and fixed-function hardware components.

Instructions used to program circuits to perform at least one embodiment can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Examples of embodiments of methods, apparatuses, systems, etc. detailed herein are listed below.

In some embodiments, a computer-implemented method comprises: partitioning port groups into one or more network sets and sampling network traffic associated with the one or more network sets. The method further comprises creating one or more resource groups based on the sampling of the network traffic associated with the one or more network sets. The method further comprises applying one or more security policies to the one or more resource groups passively, wherein security actions associated with passively applied security policies do not affect the network traffic. The method further comprises evaluating results of applying the security policies to the resource groups passively to determine whether there is at least one recommended modification to the one or more network sets, the one or more resource groups, or the one or more security policies. When there is at least one recommended modification, the method further comprises applying the at least one recommended modification to one or more of the network sets, the resource groups, or the security policies. When there is not at least one recommended modification, the method further comprises initiating active enforcement of at least a subset of the one or more security policies on the network traffic.

In some embodiments, one or more of the following applies: 1) initiating the active enforcement of the security policies on the network traffic comprises enabling at least one security action that impacts network traffic associated with the resource groups in response to a violation of a security policy; 2) applying the one or more security policies to the one or more resource groups passively comprises applying the one or more security policies against live network traffic associated with the resource groups in a monitoring only mode; 3) the at least one recommended modification includes modifying resource group members of a resource group; 4) the at least one recommended modification includes increasing a predetermined amount of time for applying the one or more security policies to the one or more resource groups passively; 5) the at least one recommended modification includes disabling a security policy; and 6) evaluating the results of applying the security policies to the resource groups includes comparing a number of results of at least one security policy to a threshold.

In some embodiments, one or more non-transitory computer-readable storage media store instructions which, when executed by one or more hardware processors, cause performance of a method comprising: partitioning port groups into one or more network sets and sampling network traffic associated with the one or more network sets. The method further comprises creating one or more resource groups based on the sampling of the network traffic associated with the one or more network sets. The method further comprises applying one or more security policies to the one or more resource groups passively, wherein security actions associated with passively applied security policies do not affect the network traffic. The method further comprises evaluating results of applying the security policies to the resource groups passively to determine whether there is at least one recommended modification to the one or more network sets, the one or more resource groups, or the one or more security policies. When there is at least one recommended modification, the method further comprises applying the at least one recommended modification to one or more of the network sets, the resource groups, or the security policies. When there is not at least one recommended modification, the method further comprises initiating active enforcement of at least a subset of the one or more security policies on the network traffic.

In some embodiments, one or more of the following applies: 1) initiating the active enforcement of the security policies on the network traffic comprises enabling at least one security action that impacts network traffic associated with the resource groups in response to a violation of a security policy; 2) applying the one or more security policies to the one or more resource groups passively comprises applying the one or more security policies against live network traffic associated with the resource groups in a monitoring only mode; 3) the at least one recommended modification includes modifying resource group members of a resource group; 4) the at least one recommended modification includes increasing a predetermined amount of time for applying the one or more security policies to the one or more resource groups passively; 5) the at least one recommended modification includes disabling a security policy; and 6) evaluating the results of applying the security policies to the resource groups includes comparing a number of results of at least one security policy to a threshold.

In some embodiments, an apparatus comprises: one or more hardware processors; and memory coupled to the one or more hardware processors, the memory storing instructions which, when executed by the one or more hardware processors, cause the apparatus to: partition port groups into one or more network sets and sample network traffic associated with the one or more network sets. The instructions further cause the apparatus to create one or more resource groups based on the sampling of the network traffic associated with the one or more network sets. The instructions further cause the apparatus to apply one or more security policies to the one or more resource groups passively, wherein security actions associated with passively applied security policies do not affect the network traffic. The instructions further cause the apparatus to evaluate results of applying the security policies to the resource groups passively to determine whether there is at least one recommended modification to the one or more network sets, the one or more resource groups, or the one or more security policies. When there is at least one recommended modification, the instructions further cause the apparatus to apply the at least one recommended modification to one or more of the network sets, the resource groups, or the security policies. When there is not at least one recommended modification, the instructions further cause the apparatus to initiate active enforcement of at least a subset of the one or more security policies on the network traffic.

In some embodiments, one or more of the following applies: 1) initiating the active enforcement of the security policies on the network traffic further causes the apparatus to enable at least one security action that impacts network traffic associated with the resource groups in response to a violation of a security policy; 2) applying the one or more security policies to the one or more resource groups passively further causes the apparatus to apply the one or more security policies against live network traffic associated with the resource groups in a monitoring only mode; 3) the at least one recommended modification includes modifying resource group members of a resource group; 4) the at least one recommended modification includes increasing a predetermined amount of time for applying the one or more security policies to the one or more resource groups passively; 5) the at least one recommended modification includes disabling a security policy; and 6) evaluating the results of applying the security policies to the resource groups includes comparing a number of results of at least one security policy to a threshold.

What is claimed is:

1. A computer-implemented method comprising:
   partitioning port groups into one or more network sets;
   sampling network traffic associated with the one or more network sets;
   creating one or more resource groups based on the sampling of the network traffic associated with the one or more network sets, wherein creating the one or more resource groups based on the sampling of the network traffic associated with the one or more network sets includes creating at least a first resource group corresponding to a first function and a second resource group corresponding to a second function;
   applying one or more security policies to the one or more resource groups passively, wherein security actions associated with passively applied security policies do not affect the network traffic;
   evaluating results of applying the one or more security policies to the one or more resource groups passively to determine whether there is at least one recommended modification to apply to the one or more network sets, the one or more resource groups, or the one or more security policies;
   when there is at least one recommended modification, applying the at least one recommended modification to one or more of the network sets, the resource groups, or the security policies; and
   when there is not at least one recommended modification, initiating active enforcement of at least a subset of the one or more security policies on the network traffic.

2. The computer-implemented method of claim 1, wherein initiating the active enforcement of the security policies on the network traffic comprises:
   enabling at least one security action that impacts network traffic associated with the resource groups in response to a violation of a security policy.

3. The computer-implemented method of claim 1, wherein applying the one or more security policies to the one or more resource groups passively comprises:
   applying the one or more security policies against live network traffic associated with the resource groups in a monitoring only mode.

4. The computer-implemented method of claim 1, wherein the at least one recommended modification includes modifying resource group members of a resource group.

5. The computer-implemented method of claim 1, wherein the at least one recommended modification includes increasing a predetermined amount of time for applying the one or more security policies to the one or more resource groups passively.

6. The computer-implemented method of claim 1, wherein the at least one recommended modification includes disabling a security policy.

7. The computer-implemented method of claim 1, wherein evaluating the results of applying the one or more security policies to the one or more resource groups includes comparing a number of results of at least one security policy to a threshold.

8. One or more non-transitory computer-readable storage media storing instructions which, when executed by one or more hardware processors, cause performance of a method comprising:
   partitioning port groups into one or more network sets;
   sampling network traffic associated with the one or more network sets;
   creating one or more resource groups based on the sampling of the network traffic associated with the one or more network sets, wherein creating the one or more resource groups based on the sampling of the network traffic associated with the one or more network sets includes creating at least a first resource group corresponding to a first function and a second resource group corresponding to a second function;
   applying one or more security policies to the one or more resource groups passively, wherein security actions associated with passively applied security policies do not affect the network traffic;
   evaluating results of applying the one or more security policies to the one or more resource groups passively to determine whether there is at least one recommended modification to apply to the one or more network sets, the one or more resource groups, or the one or more security policies;
   when there is at least one recommended modification, applying the at least one recommended modification to one or more of the network sets, the resource groups, or the security policies; and
   when there is not at least one recommended modification, initiating active enforcement of at least a subset of the one or more security policies on the network traffic.

9. The one or more non-transitory computer-readable storage media of claim 8, wherein initiating the active enforcement of the security policies on the network traffic comprises:
   enabling at least one security action that impacts network traffic associated with the resource groups in response to a violation of a security policy.

10. The one or more non-transitory computer-readable storage media of claim 8, wherein applying the one or more security policies to the one or more resource groups passively comprises:
    applying the one or more security policies against live network traffic associated with the resource groups in a monitoring only mode.

11. The one or more non-transitory computer-readable storage media of claim 8, wherein the at least one recommended modification includes modifying resource group members of a resource group.

12. The one or more non-transitory computer-readable storage media of claim 8, wherein the at least one recommended modification includes increasing a predetermined amount of time for applying the one or more security policies to the one or more resource groups passively.

13. The one or more non-transitory computer-readable storage media of claim 8, wherein the at least one recommended modification includes disabling a security policy.

14. The one or more non-transitory computer-readable storage media of claim 8, wherein evaluating the results of applying the one or more security policies to the one or more resource groups includes comparing a number of results of at least one security policy to a threshold.

15. An apparatus comprising:
    one or more hardware processors;

memory coupled to the one or more hardware processors, the memory storing instructions which, when executed by the one or more hardware processors, causes the apparatus to:

partition port groups into one or more network sets;

sample network traffic associated with the one or more network sets;

create one or more resource groups based on the sampling of the network traffic associated with the one or more network sets, wherein creating the one or more resource groups based on the sampling of the network traffic associated with the one or more network sets includes creating at least a first resource group corresponding to a first function and a second resource group corresponding to a second function;

apply one or more security policies to the one or more resource groups passively, wherein security actions associated with passively applied security policies do not affect the network traffic;

evaluate results of applying the one or more security policies to the one or more resource groups passively to determine whether there is at least one recommended modification to apply to the one or more network sets, the one or more resource groups, or the one or more security policies;

when there is at least one recommended modification, apply the at least one recommended modification to one or more of the network sets, the resource groups, or the security policies; and when there is not at least one recommended modification, initiate active enforcement of at least a subset of the one or more security policies on the network traffic.

16. The apparatus of claim 15, wherein initiating the active enforcement of the security policies on the network traffic further causes the apparatus to:

enable at least one security action that impacts network traffic associated with the resource groups in response to a violation of a security policy.

17. The apparatus of claim 15, wherein applying the one or more security policies to the one or more resource groups passively further causes the apparatus to:

apply the one or more security policies against live network traffic associated with the resource groups in a monitoring only mode.

18. The apparatus of claim 15, wherein the at least one recommended modification includes modifying resource group members of a resource group.

19. The apparatus of claim 15, wherein the at least one recommended modification includes increasing a predetermined amount of time for applying the one or more security policies to the one or more resource groups passively.

20. The apparatus of claim 15, wherein the at least one recommended modification includes disabling a security policy.

21. The apparatus of claim 15, wherein evaluating the results of applying the one or more security policies to the one or more resource groups includes comparing a number of results of at least one security policy to a threshold.

\* \* \* \* \*